US012093638B2

(12) United States Patent
Oleynik et al.

(10) Patent No.: US 12,093,638 B2
(45) Date of Patent: Sep. 17, 2024

(54) CONVERSATIONAL USER INTERFACE SYSTEM AND METHOD OF OPERATION

(71) Applicant: SLICE LEGAL, INC., Toronto (CA)

(72) Inventors: Matthew Oleynik, Toronto (CA); Chris Wise, Ottawa (CA)

(73) Assignee: Slice Legal, Inc., Toronto (CA)

( * ) Notice: Subject to any disclaimer, the term of this patent is extended or adjusted under 35 U.S.C. 154(b) by 0 days.

(21) Appl. No.: 17/612,022

(22) PCT Filed: Feb. 26, 2020

(86) PCT No.: PCT/CA2020/050251
§ 371 (c)(1),
(2) Date: Nov. 17, 2021

(87) PCT Pub. No.: WO2020/232529
PCT Pub. Date: Nov. 26, 2020

(65) Prior Publication Data
US 2022/0222424 A1    Jul. 14, 2022

Related U.S. Application Data

(60) Provisional application No. 62/849,282, filed on May 17, 2019.

(51) Int. Cl.
*G06F 40/143*        (2020.01)
*G06F 3/0482*        (2013.01)
(Continued)

(52) U.S. Cl.
CPC .......... *G06F 40/143* (2020.01); *G06F 3/0482* (2013.01); *G06F 40/131* (2020.01);
(Continued)

(58) Field of Classification Search
CPC .... G06F 40/143; G06F 3/0482; G06F 40/131; G06F 40/134; G06F 40/137; G06F 16/9038; H04L 51/02
See application file for complete search history.

(56) References Cited

U.S. PATENT DOCUMENTS 7,010,518 B1   3/2006  Bedell et al.
7,085,755 B2   8/2006  Bluhm et al.
(Continued)

OTHER PUBLICATIONS

International Search Report and Written Opinion mailed May 28, 2020, for PCT Application No. PCT/CA2020/050251, 11 pages.
(Continued)

*Primary Examiner* — Keith D Bloomquist
(74) *Attorney, Agent, or Firm* — Dickinson Wright LLP; Matthew D. Powell

(57) ABSTRACT

Disclosed herein is a computer-implemented method of carrying on a conversation, the method including: during a conversation session, receiving an electronic query initiated by a user; based on query data associated with the query, automatically retrieving first result data from a hierarchical taxonomy; in the event that the first result data contains one or more user-selectable options, generating an electronic response to the query based at least on the one or more user-selectable options; and otherwise: based on the query data, automatically retrieving second result data from a tagged-content source and generating the electronic response to the query based at least on the second result data.

19 Claims, 24 Drawing Sheets

(51) Int. Cl.
*G06F 40/131* (2020.01)
*G06F 40/134* (2020.01)
*G06F 40/137* (2020.01)
*H04L 51/02* (2022.01)

(52) U.S. Cl.
CPC .......... *G06F 40/134* (2020.01); *G06F 40/137* (2020.01); *H04L 51/02* (2013.01)

(56) References Cited

U.S. PATENT DOCUMENTS

| | | |
|---|---|---|
| 9,405,794 B2 | 8/2016 | Prakash et al. |
| 2005/0187923 A1 | 8/2005 | Cipollone |
| 2005/0216448 A1 | 9/2005 | Talib et al. |
| 2005/0278633 A1 | 12/2005 | Kemp |
| 2009/0150827 A1 | 6/2009 | Meyer et al. |
| 2014/0108576 A1 | 4/2014 | Rasmussen et al. |
| 2014/0250195 A1* | 9/2014 | Capper ................ G06N 20/00 709/206 |
| 2015/0347489 A1 | 12/2015 | Sherwin |
| 2018/0032576 A1* | 2/2018 | Romero ................ G06F 21/31 |
| 2020/0228469 A1* | 7/2020 | Mullins ................ H04L 51/02 |

OTHER PUBLICATIONS

Examination Report under Section18(3) dated Oct. 24, 2022 (Oct. 24, 2022) issued on related Great Britain patent application GB2116538.6 by the United Kingdom Intellectual Property Office.

* cited by examiner

| identifier | title | level | 0 | 1 | 2 | 3 | 4 | 5 | 6 | 7 | 8 | 9 | 10 | 11 |
|---|---|---|---|---|---|---|---|---|---|---|---|---|---|---|
| 1000 | Law | 0 | Law | | | | | | | | | | | |
| 2000 | Criminal | 1 | | Criminal | | | | | | | | | | |
| 500000 | Drug offen | 2 | | | Drug offences | | | | | | | | | |
| 501000 | Prescriptio | 3 | | | | Prescription drugs | | | | | | | | |
| 502000 | Offences | 4 | | | | | Offences | | | | | | | |
| 503000 | Where do | 5 | | | | | | Where do oxycodone, hydromorphone, fentanyl, and prescription heroin appear in the Controlled Drugs and Substances Act? | | | | | | |
| 504000 | What is the | 5 | | | | | | What is the source of the authority to possess drugs pursuant to a medical prescription? | | | | | | |
| 505000 | "Double do | 5 | | | | | | "Double doctoring" | | | | | | |
| 506000 | Is double d | 6 | | | | | | | Is double doctoring a summary, indictable, or hybrid offence? | | | | | |
| 507000 | What are t | 6 | | | | | | | What are the minimum and maximum sentences for double doctoring? | | | | | |
| 509000 | Tell me abo | 6 | | | | | | | Tell me about the actus reus. | | | | | |
| 510000 | What if the | 7 | | | | | | | | What if the accused discloses all his/her prescriptions? | | | | |
| 511000 | What if the | 7 | | | | | | | | What if the accused returns to the same doctor? | | | | |
| 512000 | What is the | 7 | | | | | | | | What is the accused's duty to disclose? | | | | |
| 513000 | Tell me abo | 6 | | | | | | | Tell me about the mens rea. | | | | | |
| 515000 | What if the | 7 | | | | | | | | What if the doctor does not warn the accused about the offence? | | | | |
| 516000 | What if the | 7 | | | | | | | | What if the accused does not know the legal status of his/her medicine? | | | | |
| 517000 | What are s | 6 | | | | | | | What are some practical aspects of a double-doctoring prosecution? | | | | | |
| 518000 | Selling a pr | 5 | | | | | | Selling a prescription | | | | | | |
| 519000 | What is the | 6 | | | | | | | What is the actus reus of selling a medical authorization? | | | | | |
| 520000 | Must this o | 6 | | | | | | | Must this offence be committed by a medical practitioner? | | | | | |
| 521000 | What if the | 6 | | | | | | | What if the Crown cannot prove the authorization was actually paid for? | | | | | |

Fig. 2

```xml
<?xml version="1.0" encoding="UTF-8"?>
<doc>
    <friendlypubdata>
        <friendlypublisher>For the Defence Magazine</friendlypublisher>
        <friendlytitle>Are you ready for Pharmageddon?: Prescription opiate abuse and the
            CDSA</friendlytitle>
        <friendlyauthors>Matthew Oleynik</friendlyauthors>
    </friendlypubdata>
    Are you ready for Pharmageddon? Prescription opiate abuse and the CDSA by Matthew Oleynik [.
    . .] The offences
    <assertion subjectnode="503000" id="10000">Oxycodone, hydromorphone, fentanyl, and
        prescription heroin are Schedule I substances and subject to the standard offences in the
        CDSA.</assertion>
    <assertion subjectnode="504000" id="10001">The authority to possess a controlled substance
        obtained for one's own use pursuant to a properly obtained medical prescription appears at s.3
        (1)(d)(ii) of the Narcotic Control Regulations.</assertion>
    Below I discuss some offences particular to prescription drugs. Double doctoring
    <assertion subjectnode="507000" id="10002">
        <assertion subjectnode="506000" id="10003">Double doctoring is a hybrid
            offence</assertion>
        , with no minimum sentence and a maximum of seven years, five years, three years, or 18
        months depending on whether the drug is in Schedule I-IV, respectively.
    </assertion>
    <assertion subjectnode="509000" id="10004">Despite the offence's nickname, it is not unlawful to
        get two prescriptions for the same drug from two different medical practitioners. The CDSA
        criminalizes the seeking or obtaining of a prescription or prescription drug only in the
        following circumstances: the patient obtains any substance in Schedule I-IV or a prescription
        for it; within 30 days the patient seeks or obtains any substance in those schedules or a
        prescription for it from a different practitioner; and on the latter date, the patient fails to
        disclose particulars of the earlier obtaining of the scheduled substance and/or
        prescription.</assertion>
    <assertion subjectnode="510000" id="10005">If the patient discloses the particulars of the earlier
        prescription to the second practitioner, no offence is committed even if a new prescription for
        the same drug is obtained.</assertion>
    <assertion subjectnode="511000" id="10006">A patient who returns only to the same practitioner
        never commits this offence.</assertion>
    <assertion subjectnode="512000" id="10007">The duty to disclose is broad and ongoing:
        obtaining any substance from Schedules I-IV (or a prescription for it) starts a 30-day
        countdown during which it is an offence to seek or obtain any substance from those schedules
        from a different practitioner without disclosing particulars of the earlier receipt. For example,
        a patient who obtains a prescription for a benzodiazepine (Schedule IV) on 17 April and
        leaves it unfilled, but then seeks a prescription for fentanyl (Schedule I) from a different
        practitioner on 12 May would need to disclose the particulars of the earlier unfilled
        prescription. If the patient fails to disclose the benzodiazepine prescription, the actus reus is
        complete even if no new prescription is obtained. If the patient does disclose and lawfully
        obtains the prescription for fentanyl, a new 30-day countdown begins for the seeking of any
        Schedule I-IV substances.</assertion>
    This may seem like a lot of calendar-keeping for a person on multiple opiate prescriptions, and
```

Fig. 3A

```xml
<assertion subjectnode="513000" id="10008">double doctoring is a full mens rea offence: the
    Crown must prove the accused knowingly or recklessly withheld the information from the
    second practitioner.</assertion>
```
However,
```xml
<assertion subjectnode="515000" id="10009">there is no requirement that the medical practitioner
    warn the accused about this offence, and the practitioner's failure to inquire about previous
    prescriptions does not make out a defence of officially-induced error.</assertion>
<assertion subjectnode="516000" id="10010">Not knowing which substances are scheduled where
    in the CDSA is likely a mistake of law and therefore not a defence, but confusion about what
    pills one is taking or how long it has been since the last appointment could raise a reasonable
    doubt about knowledge or mistake of fact.</assertion>
<assertion subjectnode="517000" id="10011">Double doctoring shows up infrequently in the
    reported caselaw, possibly because it is difficult to prosecute. Due to the critical importance of
    the 30-day countdown, the dates must be carefully particularized in the charge. Likewise, the
    information or indictment should particularize the prescriptions and practitioners so the
    accused knows which transactions are impugned. On a practical level, the practitioner must
    also be able to identify the accused which may be difficult if he or she has dealt with hundreds
    or thousands of patients by the trial date. Finally, the courts have not been particularly
    welcoming of prosecutions of patients where the medical practitioner was arguably at fault by
    recklessly or negligently writing prescriptions; however, representations by the Canadian
    Medical Association to Parliament have kept most prescription-writing practice a matter of
    professional regulation rather than criminal law.</assertion>
```
Selling an authorization
```xml
<assertion subjectnode="519000" id="10012">One situation in which the criminal law steps in is
    where a medical practitioner accepts consideration for the writing of a prescription. The
    definitions section of the CDSA states that trafficking includes selling an authorization to
    possess any substance in Schedules I-IV; "selling" also includes offering to sell, exposing for
    sale, and possessing for the purpose of sale or distribution.</assertion>
<assertion subjectnode="520000" id="10013">Although this offence could conceivably be
    committed by a non-practitioner, Parliament added prescription-selling to the definition of
    "trafficking" in response to confusion in the courts over whether the sale of prescriptions by
    medical practitioners was a criminal offence.</assertion>
<assertion subjectnode="521000" id="10014">Even if the Crown cannot prove consideration was
    exchanged, providing a prescription illegitimately may make the practitioner a party to
    unlawful possession.</assertion>
<endnotes>
    1
    <authority assertion="10001">C.R.C., c. 1041.</authority>
    2
    <authority assertion="10004">L.E. v. Desai, 2006 CanLII 28738 (Ont. S.C.J.).</authority>
    3
    <authority assertion="10006">R. v. Murphy, [1988] A.J. No. 617, 88 A.R. 279 (Prov. Ct.)
        (decided under a predecessor offence in the Narcotics Control Act, at s.3.1).</authority>
    4
    <authority assertion="10008">R. v. Manuel, [1994] N.J. No. 404, 125 Nfld. & P.E.I.R. 350
        (Prov. Ct.) (decided under a predecessor offence in the Narcotics Control Act, at
        s.3.1).</authority>
    5
    <authority assertion="10009">R. v. Murphy, supra n. 24.</authority>
```

Fig. 3B

```
6
<authority assertion="10010">R. v. Manuel, supra n. 25.</authority>
7
<authority assertion="10011">R. v. Duquesne, [1985] O.J. No. 575 (H.C.J.); R. v. Bergman,
    1984 CarswellOnt 2304 (Co. Ct.) (both decided under a predecessor offence in the
    Narcotics Control Act, at s.3.1).</authority>
8
<authority assertion="10011">T. Brucker, The Practical Guide to the Controlled Drugs and
    Substances Act, 4th ed. (Toronto: Thomson Canada, 2008), at 25.</authority>
9
<authority assertion="10013">P. Brauti & B. Puddington, Prosecuting and Defending Drug
    Offences (Aurora, Ont.: Canada Law Book, 2003), at 33.</authority>
10
<authority assertion="10014">R. v. Verma, 1996 CanLII 606 (Ont. C.A.).</authority>
</endnotes>
</doc>
```

Fig. 3C

Hutzbot API

API and SDK Documentation

Version: 1.0.0

This is an API for interfacing with the Hutzbot Conversation Engine

Developers conversationsIdAddResponsePatch add a response to a conversation

PATCH

/conversations/{id}/add_response

Usage and SDK Samples

Curl   Java   Android   Obj-C   JavaScript   C#   PHP   Perl   Python

```javascript
var HutzbotApi = require('hutzbot_api');
var defaultClient = HutzbotApi.ApiClient.instance;

// Configure API key authorization: userEmail
var userEmail = defaultClient.authentications['userEmail'];
userEmail.apiKey = "YOUR API KEY"
// Uncomment the following line to set a prefix for the API key, e.g. "Token" (defaults to null)
//userEmail.apiKeyPrefix['X-User-Email'] = "Token"

// Configure API key authorization: userToken
var userToken = defaultClient.authentications['userToken'];
userToken.apiKey = "YOUR API KEY"
// Uncomment the following line to set a prefix for the API key, e.g. "Token" (defaults to null)
//userToken.apiKeyPrefix['X-User-Token'] = "Token"

var api = new HutzbotApi.DevelopersApi()

var id = ; // {UUID} which conversation to add a response to by uuid var answer = answer_example; // {String} the valid response id to update the selected conversation with var callback = function(error, data, response) {
  if (error) {
    console.error(error);
  } else {
    console.log('API called successfully. Returned data: ' + data);
  }
};
api.conversationsIdAddResponsePatch(id, answer, callback);
```

Parameters

Path parameters

| Name | Description |
|------|-------------|

Fig. 8A

| id* | UUID (uuid) |
| --- | --- |
| | which conversation to add a response to by uuid |
| | Required |

Query parameters

| Name | Description |
| --- | --- |
| answer* | String |
| | the valid response id to update the selected conversation with |
| | Required |

Responses

Status: 200 - returns conversation

Schema

```
▼ {[]}
  Required: application,created_at,id,tagged_document,taxonomy,updated_at,user
  id:              ▼ [] string (uuid)
                       the unique ID of the conversation
  created_at:      string (date-time)
  updated_at:      string (date-time)
  taxonomy:        ▼ [] string
                       The name of the taxonomy associated with the conversation.
  tagged_document: ▼ [] string
                       The title of the tagged document associated with the conversation.
  user:            ▼ [] string
                       The name of the user associated with the conversation.
  application:     ▼ [] string
                       The application channel on which the conversation was created.
                   Default: api
                   Enum:    web email api slack voice sms
  responses:       ▼ [[]
                       A historical read-only summary of the response flow of the conversation.
                   ▼ {[]}
                       Required: id,speaker,speaker_name,statement
                       id:            ▼ [] string (uuid)
                                          the unique ID of the response
                       speaker:       ▼ [] string
                                          The party that spoke the response.
                                      Enum:    system external
                       speaker_name:  ▼ [] string
                                          The friendly name of the party that spoke the response.
                       statement:     ▼ [] string
                                          The text of the response for presentation by the speaker. May contain HTML
                                          markup which can/should in turn be translated by the presentation layer.
                       metadata:      ▼ [] string
                                          The API specific placeholder of the specific response that can be subsequently
                                          used for conversational retrieval
                   }
                   ]
  valid_responses: ▼ [[]
                       A list of acceptable responses based on the current state of the conversation.
                   ▼ {[]}
                       Required: answer,response
                       answer:   ▼ [] integer
                                     the internal identifier of the answer provided
```

Fig. 8B

```
                        response:    ▼ [] string
                                     The textual representation of that answer for display purposes.
                    }
                ]
        }
```

Status: 404 - not found conversationsIdGet get a conversation by uuid

GET
/conversations/{id}

Usage and SDK Samples

Curl   Java   Android   Obj-C   JavaScript   C#   PHP   Perl   Python

```
curl -X GET -H "X-User-Email: [[apiKey]]" -H "X-User-Token: [[apiKey]]" "https://protect-us.mimecast.com/s/l4EC31rDNcpwXJtQxfL2?domain=virtse rver.swaggerhub.com"
```

Parameters

Path parameters

| Name | Description |
|---|---|
| id* | UUID (uuid)<br>which conversation to retrieve by uuid<br>Required |

Responses

Status: 200 - returns conversation

Schema

```
▼ {[]
  Required: application,created_at,id,tagged_document,taxonomy,updated_at,user
  id:                ▼ [] string (uuid)
                       the unique ID of the conversation created_at:        string (date-time)
  updated_at:        string (date-time)
  taxonomy:          ▼ [] string
                       The name of the taxonomy associated with the conversation.

tagged_document:   ▼ [] string
                       The title of the tagged document associated with the conversation.

user:              ▼ [] string
                       The name of the user associated with the conversation.

application:       ▼ [] string
                       The application channel on which the conversation was created.

Default: api
                     Enum:    web email api slack voice sms responses:         ▼ [ []
                       A historical read-only summary of the response flow of the conversation.
```

Fig. 8C

```
▼ {}
    Required: id,speaker,speaker_name,statement
    id:             ▼ [] string (uuid)
                       the unique ID of the response
    speaker:        ▼ [] string
                       The party that spoke the response.
                    Enum:  system external
    speaker_name:   ▼ [] string
                       The friendly name of the party that spoke the response.
    statement:      ▼ [] string
                       The text of the response for presentation by the speaker. May contain HTML
                       markup which can/should in turn be translated by the presentation layer.
    metadata:       ▼ [] string
                       The API specific placeholder of the specific response that can be subsequently
                       used for conversational retrieval
    }
  }
valid_responses:  ▼ []
                  A list of acceptable responses based on the current state of the conversation.
    ▼ {}
        Required: answer,response
        answer:     ▼ [] integer
                       the internal identifier of the answer provided
        response:   ▼ [] string
                       The textual representation of that answer for display purposes.
    }
  }
}
```

Status: 404 - not found conversationsIdTagResponsesPatch tag a conversation with metadata

PATCH

/conversations/{id}/tag_responses

Usage and SDK Samples

Curl  Java  Android  Obj-C  JavaScript  C#  PHP  Perl  Python

```
curl -X PATCH -H "X-User-Email: {{apiKey}}" -H "X-User-Token: {{apiKey}}" "https://protect-us.mimecast.com/s/NOqC4xv0OHByzQ9MmaEa?domain
=virtserver.swaggerhub.com"
```

Parameters

Path parameters

| Name | Description |
|---|---|
| id* | UUID (uuid)<br>which conversation to tag responses to by uuid<br>Required |

Fig. 8D

Query parameters

| Name | Description |
|---|---|
| metadata* | String<br>the metadata to update the selected conversation with<br>Required |

Responses

Status: 200 - returns conversation

Schema

```
▼ {}
   Required: application,created_at,id,tagged_document,taxonomy,updated_at,user
   id:                ▼ [] string (uuid)
                         the unique ID of the conversation
   created_at:        string (date-time)
   updated_at:        string (date-time)
   taxonomy:          ▼ [] string
                         The name of the taxonomy associated with the conversation.
   tagged_document:   ▼ [] string
                         The title of the tagged document associated with the conversation.
   user:              ▼ [] string
                         The name of the user associated with the conversation.
   application:       ▼ [] string
                         The application channel on which the conversation was created.
                         Default: api
                         Enum:   web email api slack voice sms
   responses:         ▼ {}
                         A historical read-only summary of the response flow of the conversation.
                         ▼ {}
                            Required: id,speaker,speaker_name,statement
                            id:            ▼ [] string (uuid)
                                              the unique ID of the response
                            speaker:       ▼ [] string
                                              The party that spoke the response.
                                              Enum:   system external
                            speaker_name:  ▼ [] string
                                              The friendly name of the party that spoke the response.
                            statement:     ▼ [] string
                                              The text of the response for presentation by the speaker. May contain HTML
                                              markup which can/should in turn be translated by the presentation layer.
                            metadata:      ▼ [] string
                                              The API specific placeholder of the specific response that can be subsequently
                                              used for conversational retrieval
                         }
                      }
   valid_responses:   ▼ {}
                         A list of acceptable responses based on the current state of the conversation.
                         ▼ {}
                            Required: answer,response
                            answer:    ▼ [] integer
                                          the internal identifier of the answer provided
                            response:  ▼ [] string
                                          The textual representation of that answer for display purposes.
                         }
                      }
```

Status: 404 - not found createConversation create a new converation

Creates a new conversation

POST

/conversations

Usage and SDK Samples

Curl   Java   Android   Obj-C   JavaScript   C#   PHP   Perl   Python

```
curl -X POST -H "X-User-Email: {{apiKey}}" -H "X-User-Token: {{apiKey}}" "https://protect-us.mimecast.com/s/YjbfC5ywGPUZoMQIN48ff?domain=virt server.swaggerhub.com"
```

Parameters

Responses

Status: 200 - search results matching criteria

Schema

▼ [ ]
  undefined
]

Status: 400 - bad input parameter defaultTaggedDocument gets the default tagged document

Retrieves the default tagged document

GET

/tagged_documents/default

Usage and SDK Samples

Curl   Java   Android   Obj-C   JavaScript   C#   PHP   Perl   Python

```
curl -X GET -H "X-User-Email: {{apiKey}}" -H "X-User-Token: {{apiKey}}" "https://protect-us.mimecast.com/s/QV8QC68xJQCrEPAI2OLUb?domain=vir tserver.swaggerhub.com"
```

Parameters

Fig. 8F

Responses

Status: 200 - search results matching criteria

Schema

```
▼ {[]
    Required: created_at,id,is_default,title,updated_at
    id:         string (uuid)
    title:      string
    is_default: boolean
    created_at: string (date-time)
    updated_at: string (date-time)
  }
```

Status: 400 - bad input parameter defaultTaxonomy gets the default taxonomy

Retrieves the default taxonomy

```
GET
/taxonomies/default
```

Usage and SDK Samples

| Curl | Java | Android | Obj-C | JavaScript | C# | PHP | Perl | Python |

```
curl -X GET -H "X-User-Email: [[apiKey]]" -H "X-User-Token: [[apiKey]]" "https://protect-us.mimecast.com/s/aK8uC73yKRcAvzdFAc8mx?domain=virt
server.swaggerhub.com"
```

Parameters

Responses

Status: 200 - search results matching criteria

Schema

```
▼ {[]
    Required: created_at,id,is_default,name,updated_at
    id:         string (uuid)
    name:       string
    is_default: boolean
    created_at: string (date-time)
    updated_at: string (date-time)
  }
```

Status: 400 - bad input parameter

Fig. 8G search the list of tagged documents gets a list of tagged documents

Retrieves the list of tagged documents

GET

/tagged_documents

Usage and SDK Samples

Curl   Java   Android   Obj-C   JavaScript   C#   PHP   Perl   Python

```
curl -X GET -H "X-User-Email: {{apiKey}}" -H "X-User-Token: {{apiKey}}" "https://protect-us.mimecast.com/s/2vshC82zLVi6lXZS9G3zO?domain=virts
erver.swaggerhub.com"
```

Parameters

Responses

Status: 200 - search results matching criteria

Schema

Status: 400 - bad input parameter search the list of taxonomies gets a list of taxonomies

Retrieves the list of taxonomies

GET

/taxonomies

Usage and SDK Samples

Curl   Java   Android   Obj-C   JavaScript   C#   PHP   Perl   Python

```
curl -X GET -H "X-User-Email: {{apiKey}}" -H "X-User-Token: {{apiKey}}" "https://protect-us.mimecast.com/s/WKYTC9rAMWtkvzgiq-NnC?domain=virt
server.swaggerhub.com"
```

Parameters

Responses

Status: 200 - search results matching criteria

Schema

Status: 400 - bad input parameter

Fig. 8H searchConversations gets the list of conversations

Retrieves the list of conversations

GET

/conversations

Usage and SDK Samples

Curl    Java    Android    Obj-C    JavaScript    C#    PHP    Perl    Python curl -X GET -H "X-User-Email: {{apiKey}}" -H "X-User-Token: {{apiKey}}" "https://protect-us.mimecast.com/s/IUZ1C0RozKfGKkDlqN1LR?domain=virt
server.swaggerhub.com"

Parameters

Query parameters

| Name | Description |
|---|---|
| metadata | String<br>find conversations by metadata |

Responses

Status: 200 - search results matching criteria

Schema

▼ [ ]
    undefined
  ]

Status: 400 - bad input parameter

Suggestions, contact, support and error reporting:

Information URL: https://protect-us.mimecast.com/s/iajDCgJD40fArqxFkEz2u?domain=helloreverb.com (https://protect-us.mimecast.com/s/iajDCgJD40fArqxFkEz2u?domain=helloreverb.com)
Contact Info: cwise@murmurinformatics.com (cwise@murmurinformatics.com)

Apache 2.0
https://protect-us.mimecast.com/s/KJtdCjRg41fn2YMCpFzKR?domain=apache.org

Fig. 8I

🔒 matthewoleynik / hutzbot-ruby Private

Branch: master ▾  hutzbot-ruby / README.md                                           Find file   Copy path cwise updated documentation                                                          1b6c7f4  7 days ago 1 contributor 56 lines (34 sloc)  2.4 KB

Hutzbot

This gem wraps the Hutzbot API:

Installation

Add this line to your application's Gemfile:

```
gem 'hutzbot'
```

And then execute:

```
$ bundle
```

Or install it yourself as:

```
$ gem install hutzbot
```

Usage

Carrying on a conversation with Hutzbot requires the following workflow:

Full Method

- start a conversation with `Hutzbot.start_conversation`
- render the response from the engine
    - render the `responses` presented and not yet displayed
    - present the options from the `valid_responses` collection and gather a response from the user
    - answer the engine with `add_response` providing the `id` of a valid response
    - tag any open responses with metadata placeholders required by the presentation engine (e.g. the mail message id for an email client or the Slack thread id for a Slack conversation)
- continue the process until the conversation comes to an end

Simple Method

- simply call `Hutzbot.converse` to carry on a conversation by passing in metadata
    - if no metadata is provided, it is assumed to be a new conversation

Fig. 8J

- if metadata is provided, the conversation is retrieved via a search by metadata

Development

After checking out the repo, run `bin/setup` to install dependencies. Then, run `rake spec` to run the tests. You can also run `bin/console` for an interactive prompt that will allow you to experiment.

To install this gem onto your local machine, run `bundle exec rake install`. To release a new version, update the version number in `version.rb`, and then run `bundle exec rake release`, which will create a git tag for the version, push git commits and tags, and push the `.gem` file to rubygems.org.

Contributing

Bug reports and pull requests are welcome on GitHub at https://github.com/cwise/hutzbot-ruby. This project is intended to be a safe, welcoming space for collaboration, and contributors are expected to adhere to the Contributor Covenant code of conduct.

License

The gem is available as open source under the terms of the MIT License.

Code of Conduct

Everyone interacting in the Hutzbot::Ruby project's codebases, issue trackers, chat rooms and mailing lists is expected to follow the code of conduct.

Fig. 8K

CONVERSATIONAL USER INTERFACE SYSTEM AND METHOD OF OPERATION

CROSS-REFERENCE TO RELATED APPLICATION

This application is the U.S. National Phase of PCT/CA2020/050251 filed Feb. 26, 2020, which claims priority to U.S. Provisional Patent Application Ser. No. 62/849,282 filed on May 17, 2019, the contents of which are incorporated herein by reference.

FIELD OF THE INVENTION

The following relates generally to user interfaces for computing systems, and more particularly to a conversational user interface system and method of operation.

BACKGROUND OF THE INVENTION

Various user interfaces for computing systems such as mobile devices, laptop and desktop computers, server systems, and the like, are known, and are provided generally for enabling a human user to interact with a computing system to execute some action with and/or to retrieve some information.

Conversational user interfaces are those that provide a user with the experience of conversing with a computing system in a back-and-forth manner in order ultimately to execute an action or to retrieve a particular piece of information. Conversational user interfaces can be deployed in instances where back-and-forth interactions with a computing system are preferable to requiring a user to specify from the outset precisely what he or she requires.

While known conversational interfaces are useful, improvements are desirable. For example, conversational user interfaces typically are implemented by "hardcoding" much of the content—such as options available to a user—into the software code used to implement the conversational user interface. Since the software code is inextricably coupled with the content itself, there is little possibility of taking advantage of distributed computing solutions useful for computer processing and storage efficiencies.

Furthermore, modifications to the information that is to be presented to users can be difficult. In addition to the information and such modifications having to be logically structured in a particular way, such modifications tend to require specialized programming skills and expensive quality assurance processes to implement professionally. This difficulty tends to restrict the applicability of conversational user interfaces to only specific kinds of information-retrieval for which the body of information and sets of options that may be available to a user rarely increases or changes. As such, conversational user interfaces are used typically in customer-service contexts, where the set of potential interactions with an organization are well-understood and well-defined as between customer and organization.

Other types of content that a user may wish to access are available in electronic form, but there is currently no solution for enabling such content to be effectively accessed using various user applications, using various devices such as smartphones, tablets, desktop computers and the like in an effective manner. That is, in a manner that would be satisfying to the user.

Also, content in textbooks is typically structured and presented in an original form for one kind of user, such as a professional user, which presents a restriction on the number of potential consumers of the content itself.

SUMMARY OF THE INVENTION

In accordance with an aspect, there is provided a computer-implemented method of carrying on a conversation, the method comprising: during a conversation session, receiving an electronic query initiated by a user; based on query data associated with the query, automatically retrieving first result data from a hierarchical taxonomy; in the event that the first result data contains one or more user-selectable options, generating an electronic response to the query based at least on the one or more user-selectable options; and otherwise: based on the query data, automatically retrieving second result data from a tagged-content source and generating the electronic response to the query based at least on the second result data.

In accordance with another aspect, there is provided a system for carrying on a computer-based conversation, the system comprising: a processor-implemented conversation engine comprising: an interface for receiving electronic queries and providing electronic responses to the electronic queries; a first retrieval process for retrieving first result data from a hierarchical taxonomy based on query data associated with a received electronic query; a second retrieval process for retrieving second result data from a tagged-content source based on the query data; and a response-generating process responsive to the interface for: causing execution of the first retrieval process; in the event that the first result data contains one or more user-selectable options, generating the response based at least on the one or more user-selectable options; and otherwise: causing execution of the second retrieval process and generating the response based at least on the second result data.

In accordance with another aspect, there is provided a non-transitory computer readable medium embodying a computer program executable on a server system for carrying on a conversation, the computer program comprising: computer program code for, during a conversation session, receiving an electronic query initiated by a user; computer program code for, based on query data associated with the query, automatically retrieving first result data from a hierarchical taxonomy; and computer program code for: in the event that the first result data contains one or more user-selectable options, generating an electronic response to the query based at least on the one or more user-selectable options; and otherwise: based on the query data, automatically retrieving second result data from a tagged-content source and generating the electronic response to the query based at least on the second result data.

In accordance with another aspect, there is provided a computer-implemented method of carrying on a conversation, the method comprising: during a conversation session, receiving an electronic query initiated by a user; based on query data associated with the query, automatically retrieving result data from at least one of: a hierarchical taxonomy and a tagged-content source; generating an electronic response to the electronic query based on the result data, wherein in the event that result data contains one or more user-selectable options from the hierarchical taxonomy, the electronic response is generated based on the one or more user-selectable options, and otherwise: the electronic response is generated based on result data from the tagged-content source.

In an embodiment, the method comprises: prior to automatically retrieving result data, determining whether result data should be retrieved solely from the hierarchical taxonomy or solely from the tagged-content source.

In another embodiment, the method comprises: during automatically retrieving result data: automatically retrieving result data from the hierarchical taxonomy; and, in the event that the result data retrieved from the hierarchical taxonomy does not contain one or more user-selectable options, automatically retrieving result data from the tagged-content source.

Methods and configurations of systems of the present invention provide various advantages. For certain embodiments, disaggregating a hierarchical taxonomy from the underlying content to which it pertains (the tagged-content source), enables the hierarchical taxonomy to operate as a mechanism by which access to the underlying content can be controlled and, if desired, adjusted over time.

For example, in embodiments the hierarchical taxonomy, being—in one sense—the portal through which a user must pass to eventually access the underlying content, can be constructed to present a user with options pertaining to only a subset of the underlying content. As such, the underlying content itself would not need as often, or at all, to be carefully studied and changed to change how a given user can access it.

Furthermore, a user's access to underlying content, either based on their viewpoint (say, expert versus amateur, or professional versus client) or their subscription level (in a paid embodiment) could be controlled at the level of the hierarchical taxonomy by providing the user with a respective taxonomy that accords with such a viewpoint or subscription level. In this way, a given underlying content—a textbook, for example—could serve many different purposes, simply by controlling which user is presented with which hierarchical taxonomy. That is, a given hierarchical taxonomy could be produced that effectively masks-out or unmasks access to the underlying content as desired by the service provider for a given user or class of users.

Furthermore, the hierarchical structure of the taxonomy is useful for a system such as a conversational user interface that will present options one level at a time, rather than all at once. This serves to hide the overall hierarchical taxonomy from the user thereby to prevent overwhelming the user with options on every query. With time, a user accessing underlying content via various branches of a hierarchical taxonomy will, of course, eventually become familiar with its entire structure having navigated it. However, the user not being presented with the whole structure of the hierarchical taxonomy on a user device at any one time will enable the user to focus and be presented with the information that he or she is seeking at any one time. This can be very useful for engaging a user when a particular hierarchical taxonomy requires numerous topic and subtopic structures spanning a wide range of subject-matter.

Furthermore, disaggregating the hierarchical taxonomy from the tagged-content source and from the conversation engine enables various computing architectures to be deployed to implement the systems and methods in ways that can account for local and remote storage requirements, local and remote retrieval latency, and upgradeability of information with small disruption to a user or to a service provider. By modifying the user experience via either modifications to a hierarchical taxonomy or to the tagged-content source, software code modifications, with all of the attendant risks and quality assurance process requirements, would not be required.

With regard to upgrading of information, the systems and methods disclosed herein are particularly useful, due to their disaggregated architecture, for providing access to underlying content that could change more frequently than the hierarchical taxonomy, thereby to provide updated content without disrupting the user's familiarity with way the information can be accessed using a conversational user interface. For example, professional "looseleaf" legal publications available in paper form or even online are updated from time to time by authors in response to events that may happen intermittently, with certain types of information changing daily, and other types of information changing at other rates. Such information may take the form of new Court decisions, modifications to legislation, modified administrative authority guidance or rules, and the like. A given hierarchical taxonomy implemented as disclosed herein could, in the face of certain such changes in the legal landscape, remain relatively unchanged, while the underlying content—in the tagged-content source—could be changed at a greater frequency as its authors adapt it. The system could thereby present more or modified information in response to a particular selection by a user who has reached the end of a branch of the hierarchical taxonomy. In this way, an option may be provided in the hierarchical taxonomy that, in one week, guides the user to certain information and, starting the next week, due to interim changes in the legal landscape and corresponding authoring about the changes, guides the user in the same way but presents new information.

Furthermore, continuing with the legal information example, if a particular new piece of legislation or new administrative authority guidance (as examples) were to be created that broadly fitted within the subject-matter to which an existing hierarchical taxonomy pertains, but had no direct corresponding pathway in the hierarchical taxonomy, an adjustment to that hierarchical taxonomy could then be prepared and promulgated to users as an upgrade. This adjusted hierarchical taxonomy would provide a new user-selectable option (and underlying sub-options, as needed) so the user could embark on another branch of conversational inquiry within the overarching subject area without a major disruption in their user interface. A user might be delighted to see a new selectable sub-option pertaining specifically to a new sub-topic that his or her colleagues have been talking about amongst themselves.

Furthermore, certain existing underlying content in a tagged-content source may suddenly capture newfound interest, based on some event that has occurred outside of the system. For example, the importance of an older legal case written about in a legal text may be considered enhanced in light of a new Court decision referring to it. Without modifying the underlying content in a tagged-content text that includes an analysis of the older legal case, the hierarchical taxonomy providing access to such content might be slightly modified to make that older legal case a particular user-selectable option, rather than merely a footnote (for example), in anticipation that it is likely to be considered of interest to the users based on the current events. As can be seen, various very useful adjustments could thus be made rapidly and without seriously jeopardizing the quality with which the conversational user interface operates.

BRIEF DESCRIPTION OF THE DRAWINGS

Embodiments of the invention will now be described with reference to the appended drawings in which:

FIG. 2 is a spreadsheet implementation of a simplified portion of a hierarchical taxonomy for use in the system of FIG. 1;

FIGS. 3A, 3B and 3C, hereinafter referred to simply as FIG. 3, is an XML implementation of a tagged-content source corresponding to the portion of the hierarchical taxonomy of FIG. 2 for use in the system of FIG. 1;

FIGS. 8A through 8K, hereinafter referred to simply as FIG. 8, is a listing of functions available via an API for a software implementation of a conversation engine, for access via JavaScript scripting language.

DETAILED DESCRIPTION

Figure 1:
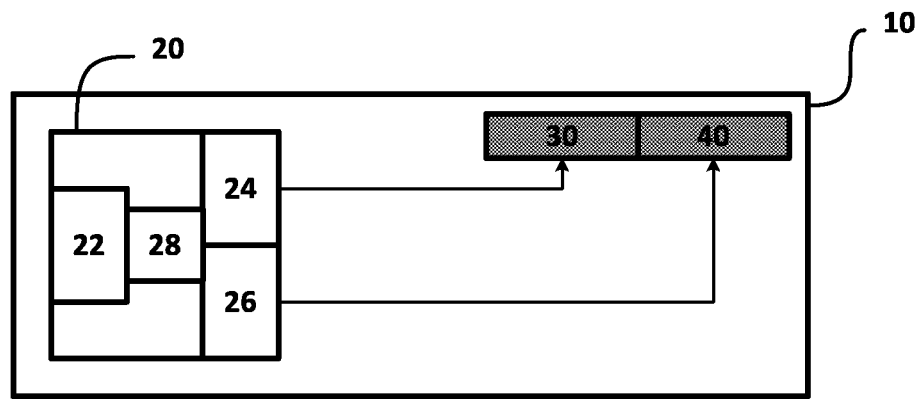
FIG. 1 is a schematic diagram of a system for carrying on a computer-based conversation, according to an embodiment.

FIG. 1 is a schematic diagram of a system 10 for carrying on a computer-based conversation, according to an embodiment. In this embodiment, system 10 includes a processor-implemented conversation engine 20, a hierarchical taxonomy 30, and a tagged-content source 40.

In this embodiment, conversation engine 20 includes an interface 22 for receiving electronic queries and providing electronic responses to the electronic queries, as will be described. In this embodiment, such queries and responses are provided from and to a software application that is engaged in a conversation involving a user, either directly with the user or as a serving software application that is in communication with another user-facing software application being used by the user.

In this embodiment, conversation engine 20 further includes a first retrieval process 24 that is configured to retrieve first result data from hierarchical taxonomy 30 based on query data associated with an electronic query received via interface 22. Conversation engine 20 also includes a second retrieval process 26 that is configured to retrieve second result data from tagged-content source 40 based on the query data that is associated with the electronic query received via interface 22.

In this embodiment, conversation engine 20 also includes a response-generating process 28 that is responsive to interface 22 and that will, in turn, cause execution of first retrieval process 24. Response-generating process 28 determines whether the first result data retrieved by first retrieval process 24 contains one or more user-selectable options. In the event that the first result data does contain one or more user-selectable options, response-generating process 28 generates the response based at least on the one or more user-selectable options. Otherwise, response-generating process 28 causes execution of second retrieval process 26 and generates the response based at least on the second result data. Conversation engine 20 further engages computer memory for storing records of conversation instances in association with unique conversation identifiers for later retrieval of the conversation text and/or other information about conversation instances, and for tracking the state of each conversation instance so that it may be progressively navigated through and/or continued at a later time if temporarily suspended.

Initiation of a new conversation is done in response to a user request, such as for example by sending a new conversation request message via a user-facing application (SMS application, e-mail application, Web application), or more particularly its server-side counterpart, to the conversation engine 20. A simple "hello" or some other message from a user, entered into a smartphone SMS application and sent to a destination number corresponding to the application using the conversation engine 20, may suffice to initiate a new conversation. A unique identifier of the user, such as the user's telephone number or subscriber number, device MAC (Media Access Control) address, web cookie (depending on the user-facing application and the security requirements of the overall system), or other trusted unique identifier for the user is sent automatically by the application to conversation engine 20. Conversation engine 20, determining from a list of active conversations maintained by conversation engine 20 that no existing conversation is being maintained in respect of the unique identifier of the user making the user request, generates a new conversation instance having a new, unique, conversation ID and adds it to the list of active conversations. In the event that a conversation instance is already active for that user identifier, then conversation engine 20 considers the new conversation request as an addition to the active conversation, and may conduct downstream processes accordingly or, depending on the content of the user request, may reject the user request as being outside of the set of acceptable responses for this stage of the conversation. Whether such problem resolution is done by processes in conversation engine 20 or by a server-side application or the like, will depend on the implementation. For example, it may be a requirement of conversation engine 20 that an application interfacing with it handle all exceptions so that conversation engine 20 is only being provided with good instructions/queries. Alternatively, conversation engine 20 may handle some exceptions thereby to produce error codes for the application to handle in respect of the user-facing side of the application in some appropriate manner for the application.

Otherwise, conversation engine 20 adds the request message to a conversation thread maintained by the conversation instance, generates a response, adds the response to conversation thread, and returns the response to the application entering the new conversation request of conversation engine 20. In embodiments, the entire conversation thread is returned with each response. In other embodiments, only the latest addition to the conversation thread is returned with each response. This initial response to a new conversation request message also includes the new and unique conversation ID, for tracking the conversation thread. The application having made the request receives the response and is thereby equipped to make subsequent queries of conversation engine 20 for this user conversation using the conversation ID. It will be understood that a server-side application that interacts with conversation engine 20 may itself be interacting on its other end with multiple different user applications being used by multiple respective users. As such, the server-side application can keep track of conversations for the multiple users by keeping track of the conversation ID's in association with respective user identifiers. In this embodiment, this is done by the server-side application maintaining a correspondence table linking each conversation ID to a respective user identifier, so that the server-side application can properly broker queries and corresponding responses between a given user application and conversation engine 20. Other methods may be used, such as by integrating a message broker component into the server-side application, so as to handle efficiently queuing and brokering messages between components of the system that do not otherwise require tighter integration.

In embodiments, conversation engine 20 is preconfigured with a default hierarchical taxonomy 30 and a default tagged-content source 40 that corresponds to the hierarchical taxonomy 30, so that new conversation requests that do not specify, in query data, a particular subject are nevertheless considered made in respect of the defaults. That is, the new conversation instance is automatically configured with parameters referring to the defaults. In other embodiments, as will be described, a new conversation request causes conversation engine 20 to consult a subject-index and present subject options to the application to, in turn, present to the user. In such embodiments, only upon selection of one of the subject options would conversation engine 20 configure the parameters for hierarchical taxonomy 30 and tagged-content source 40 for that conversation accordingly.

In embodiments, conversation engine 20 may also conduct an authorization process for the user identifier corresponding to the user making the request, thereby to determine whether (and, to what underlying content) the user has access. For example, a user that is not authorized to access the underlying content making a new conversation request would, in turn, cause the interfacing application to provide a user identifier to conversation engine 20 that did not correspond to a system subscription list, and conversation engine 20 would then throw an exception or error code back to the interfacing application informing it of this. In an embodiment, the interfacing application informs the requesting user that he or she does not have access. Alternatively, the interfacing application sends no response to the user. In an embodiment, the interfacing application maintains a blacklist for a time to reject further requests so as not to generate invalid requests of conversation engine 20 should an unauthorized user be persistent or should a denial-of-service (DOS) attack be launched. If the user is authorized, however, levels of authorization/access can be governed by conversation engine thereby to provide access to underlying content to which the user has authorized access, via the hierarchical taxonom(ies) and tagged-content source(s) most appropriate for the user. Conversation engine 20, therefore, can set the parameters for a new conversation instance according to the user's level of authorized access to certain content and preconfigured preferences. This may be established at an institutional level, such that a student of a University taking a particular course is authorized according to the level of subscription paid for by that University for students in that course, and a lawyer at a firm is authorized according to the level of subscription paid for by that firm for lawyers in that firm. Variations are possible.

In this embodiment, the one or more user-selectable options retrieved from hierarchical taxonomy 30 correspond to any children of a given node in hierarchical taxonomy 30 that is referred to in the query data received in association with an electronic query made via interface 22. For example, in the event that an electronic query is made via interface 22 that includes an identification of a particular node in hierarchical taxonomy 30, the first result data will include data about any children of that particular node in hierarchical taxonomy 30. This is done by first retrieval process 24 searching hierarchical taxonomy 30 for a node corresponding to the identification of the particular node received with the query data. Upon locating the corresponding node in hierarchical taxonomy 30, first retrieval process 24 will collect all children of that particular node.

The process by which all children are retrieved will depend on the structure of hierarchical taxonomy 30. As such, the structure of hierarchical taxonomy 30 (or, for example, of a software object in which hierarchical taxonomy 30 may be encapsulated and via functions of which hierarchical taxonomy 30 is to be interacted with), should correspond to the first retrieval process 24. For example, FIG. 2 is a spreadsheet implementation of a portion of a simplified hierarchical taxonomy 30A corresponding to a tagged-content source of legal content. In an embodiment, in order for first retrieval process 24 to retrieve first result data from taxonomy 30A, first retrieval process 24 would, having been provided (by the application) with an identifier that had been in the query data, compare the entries in the "identifier" column of taxonomy 30A to the identifier. Various approaches to this are possible, depending on the search algorithm, the convention of logical structure by which the hierarchical taxonomies of system 10 are to be formatted, the data structure in which hierarchical taxonomy 30A is maintained, and any interface to hierarchical taxonomy 30A in the event that the implementation involves encapsulation of hierarchical taxonomy 30A within its own object.

In this embodiment, with hierarchical taxonomy 30A being embodied simply as a spreadsheet document in a file and having the illustrated logical structure, searching is done beginning at the topmost row and working downwards, until an entry in the "identifier" column that corresponds to the identifier provided in the query data has been found. Upon finding the entry in the "identifier" column that corresponds to the identifier provided in the query data, which corresponds to the node of the taxonomy referred to in the query data, first retrieval process 24 consults the "level" column of the same row for the entry in the "level" column. In order to gather any children of the located node, first retrieval process 24, beginning at the current row and working downwards, collects identifiers and corresponding titles of any subsequent rows with a level that is one level higher than the level of the identified node. This continues only until first retrieval process 24 reaches a row with a level that is the same as, or less than, the level of the identified node. First retrieval process 24 does not collect the identifier and corresponding title of such a row. With a collection of any children node information as the first result data, first retrieval process 24 returns this first result data to response-generating process 28.

As an example, if query data received by interface 22 contained an identifier equal to "501000" then, referring to hierarchical taxonomy 30A, first retrieval process 24 would begin by comparing the received "501000" to the identifier column entry starting with the topmost row (with entry "1000") in hierarchical taxonomy 30A. First retrieval process 24 would continue downwards through "2000", and so forth until it reached "501000". The row with identifier "501000" has a title of "Prescription drugs" in hierarchical taxonomy 30A. First retrieval process 24 would therefore have reached the row corresponding to the identifier included in the query data received by interface 22.

First retrieval process 24 would then observe that node "501000" in hierarchical taxonomy 30A has a "level" of 3. To gather any children of node "501000", therefore, first retrieval process 24 would then collect identifiers and corresponding titles of subsequent (continuing downwards) rows with a level of 4, only until first retrieval process 24 reached a row with a level of 3 or lower (or the end of hierarchical taxonomy 30A). This this example, therefore, first retrieval process 24 would collect the following children entry(ies) in hierarchical taxonomy 30A in response to query data corresponding to node "501000", as shown in Table 1 below:

TABLE 1

| Identifier | Title | Level |
|---|---|---|
| 502000 | Offences | 4 |

As such, first retrieval process 24 in this instance will have, using query data including "501000" provided via interface 22, been provided first result data with one or more options—that is, the one option in Table 1, above—to response-generating process 28.

Response-generating process 28, in turn, generates a response to the electronic query received by interface 22 based on the first result data. In this embodiment, the response is generated to include the identifiers and corresponding titles of the children retrieved by first retrieval process 24 from hierarchical taxonomy 30A, so that an application making the query via interface 22 would have node identifiers with which to provide a subsequent query to interface 22 thereby to continue the conversation.

On the other hand, continuing with this example, if query data received by interface 22 contained an identifier equal to "515000", corresponding to "What if the doctor does not warn the accused about the offence?" in hierarchical taxonomy 30A, first retrieval process 24 would determine that this node does not have any children, because in an attempt to gather children, first retrieval process 24 would reach the next row (with identifier "516000") and determine that this next row has the same "level" value as the "515000" row (namely, 7). Because first retrieval process 24 would not collect the identifier and corresponding title of this next row, and would also cease searching at this point, first retrieval process 24 would not have, using query data including "515000" provided via interface 22, provided first result data with one or more options to response-generating process 28. Accordingly, response-generating process 28 would proceed to cause execution of second retrieval process 26.

Second retrieval process 26 would, upon execution, search a different source for second result data so that response-generating process 28 would have data with which to generate a response to the query received by interface 22. In this example, the different source is a tagged-content source 40A.

Second retrieval process 26 would search through tagged-content source 40A for any tags having a "subjectnode" that corresponds to the node identifier in the query data received via interface 22. Second retrieval process 26 would then retrieve all data tagged with this node identifier as the second result data, and response-generating process 28 would generate the response based on this second result data. For example, response-generating process 28 may provide all returned second result data in response to the query, may provide a subset of the second result data, or may supplement the second result data for generating the response. For example, based on the second result data, the response-generating process 28 might conduct additional retrieval processes into tagged-content source 40A, may conduct auxiliary retrieval processes to collect data from outside of system 10 (such as retrieving auxiliary data from a website external to system 10), or take some other action.

Continuing the above example referring to hierarchical taxonomy 30A, FIG. 3 is an XML implementation of a tagged-content source 40A of legal content corresponding to hierarchical taxonomy 30A. Second retrieval process 26 would begin by comparing the received "515000" to the "subjectnode" argument in assertion tags present in tagged-content source 40A. In this example, second retrieval process 26 would, in this example, find one tag having subjectnode="515000" (see FIG. 3B), and would thus return to response-generating process 28 second result data as follows:

<assertion id="10009" subjectnode="515000">there is no requirement that the medical practitioner warn the accused about this offence, and the practitioner's failure to inquire about previous prescriptions does not make out a defence of officially-induced error.</assertion>

Response-generating process 28, in turn, would generate a response based at least on this second result data for provision via interface 22 in response to the query.

In this embodiment, response-generating process 28 would generate a response based on the content of second result data, so that the user-facing application would present such underlying content within the user-facing application itself. However, in alternative embodiments, or as an additional aspect triggered as a consequence of the content retrieved from tagged-content source 40 being too lengthy for presentation in the user-facing application, the response-generating process 28 would alternatively generate or retrieve, from tagged-content source 40 or hierarchical taxonomy 30 or another source, a hyperlink or other pointer for presenting to a user in the user-facing application. In turn, the user selecting the presented hyperlink or other pointer from within the user-facing application would trigger the instantiation of a Web browser application on the user device and the navigation of that instantiation of the Web browser application to tagged-content source 40. An example of the user-facing experience for this alternative way of providing a user with content from a tagged-content source 40 via a hyperlink to a Web browser executed on the user device and navigated to the content, is shown in FIG. 7.

With many user-facing applications, a user is free to enter a selection or content in the midst of a conversation that does not accord with any of the options being set out for the user. For example, a user when prompted to type a number into an SMS corresponding to one of a number of potential selections made to the user, may type "Hi Mom" by accident. Handling of such an invalid response (ie., invalid to conversation engine 20, at least) may be conducted at various stages in the system. For data and access security (particularly for overall systems in which it will be common for a conversation engine 20 to be provided by a different provider than an interfacing application such as a server-side texting application for integration into the interfacing application), handling of such invalid entries is most appropriately done at least by, or under the control of, conversation engine 20 itself. As such, conversation engine 20 maintains, for each instance of conversation it is handling, a set of valid next responses against which the actual next response can be measured. Such valid next responses may be maintained in a table in association with the conversation ID for that conversation instance, for example. If conversation engine 20 were to receive a query that could not be resolved against any entries in such a table, conversation engine 20 would throw an exception and return an error code to the interfacing application. Similar measures might be built into the interfacing application itself, so that depending on the needs of its users and how it is constructed, it could maintain its own list of valid responses (which might include other valid responses in addition to those considered acceptable by conversation engine 20 that the interfacing application could respond to itself without using conversation engine 20, or fewer than the whole number of valid responses being maintained at the particular stage of the conversation by conversation engine 20 in respect of that conversation).

By providing a conversation engine 20 that can be disaggregated from, but interoperable with, an interfacing application as has been described, a software developer can have freedom in developing the interfacing application to do more than interface with conversation engine 20. A software developer may provide exception handling, more or fewer conversational options than are furnished via conversation engine 20, or other application functionalities that may enhance a user experience, or even enable interfacing with a second, different conversation engine 20 on behalf of the same user. As for this latter configuration, a given service provider, such as a telecom service provider offering the interfacing application, might provide a single access point (a subscriber number) that could be messaged by a user, but that could ultimately interface with two different conversation engines 20 provided by two different content providers. Such content providers might arrange a subscription as respectively between themselves and the telecom service provider so that their content could be made available through the telecom service provider in turn to its users, yet be fully controllable in hierarchical taxonomy and tagged-content document by each respective content provider, independently of any other content providers. For example, a telecom company might provide their customers with conversational access, via an SMS application, to both TV guide information provided by one content provider and upcoming weather information provided by another content provider. While such a centralized access point could be useful in various instances, it will be understood that its success could be limited by a user's tolerance for having to converse-through various disparate topics when he or she has only one topic in mind. However, various implementations are made available by the architectures disclosed herein.

Furthermore, as can be seen, with system 10, a conversational user interface can be provided that disaggregates the contents (the hierarchical taxonomy 30 and the underlying content in the tagged-content source 40 with which it is associated) from the mechanism of retrieving the contents (the conversation engine 20), and that further disaggregates the navigation- or guidance-related content (in the hierarchical taxonomy 30) from the underlying substantive content (in the tagged-content source 40).

Disaggregating these components while enabling them to work successfully together provides a great deal of flexibility for how system 10 can be implemented, and how system 10 can be updated when content changes or a new kind of user is requesting access to data. For example, while system 10 can be implemented entirely on a user device to provide one mode of access (such as through an application running on the user device), system 10 can easily be implemented in a distributed fashion. For example, system 10 may be implemented with conversation engine 20 installed on a user device as integrated with a user-facing application by integration during development of a conversation engine library and calls from the user-facing application to interface 22 using an API (application programming interface).

In such an example, hierarchical taxonomy 30 may be stored local to the user device along with the executable code for the conversation engine and the application, while tagged-content source 40 may be stored remotely in a remote server accessible using a network. It will be understood that repeated retrievals of first result data may be made of such a local hierarchical taxonomy as a user navigates from node to child node to grandchild node and so forth with the help of the conversation engine 20, without requiring the use of network bandwidth until such time as an end of branch of the hierarchical taxonomy 30 is reached (no further children) and a network request must be sent to conduct a retrieval of the second result data from the remote tagged-content source.

In another embodiment, the system 10 may at least be partly stored remote from the user device, and may interact with an application on the user device via an application local to system 10. For example, in a texting implementation of a conversation user interface, a user may send a text using a locally-installed texting application (such as Messenger) to a contact, where the contact corresponds to a configured texting application executing on a remote server. The texting application itself would be configured to make queries to a locally or remotely-installed conversation engine 20 via interface 22, with the queries including respective query data. As such, conversation engine 20 receiving such a query would generate a response to the query as described above and that response would be received by the texting application. The texting application would, in turn, construct a user-facing response based on the response provided via interface 22 to the texting application. Such a user-facing response may include all of the content of the response from conversation engine 20, a subset of the content of the response, or additional content such as additional options that the texting application is able to offer to the user. The texting application would then transmit its user-facing response via the network to be received at the locally-installed texting application on the user device for display to the user. Accordingly, the user would either be provided with one or more options for continuing the conversation based on first result data retrieved from hierarchical taxonomy 30 or the underlying content based on second result data retrieved from the tagged-content source 40.

Due to the architecture enabled by the provision of conversation engine 20 as disaggregated from the content and configured to be integrated with an application as described above, a given hierarchical taxonomy 30 could provide conversational content for a number of different user-facing applications. For example, a given hierarchical taxonomy 30 could provide conversational content for a texting (SMS) application as described above, an email application, a Slack application, a web application, a custom mobile app, and so forth. This disaggregated but interdependent architecture thus enables a given user to access the same content, subject to permissions, from different devices for use in different contexts. For example, a given user interested in legal content may prefer, during the normal course of work, to access the legal content in a textbook using a desktop application or a web application on a desktop or laptop computer. However, that user may need quick answers during a trial or negotiation, and may wish to send SMS (short message service) messages using a mobile texting application that is ultimately backed by the underlying content but, using the system of the present invention, made far more accessible and digestible via the SMS application.

In embodiments, the mode (or channel) by which the underlying content is to be accessed may inform which of different hierarchical taxonomies 30 are automatically selected for navigating the content. For example, a texting hierarchical taxonomy 30 may automatically be selected for a texting application that integrates the conversation engine 20, so that query data provided via interface 22 to conversation engine 20 are used by first retrieval process to access the texting hierarchical taxonomy 30. In such an embodiment, upon requesting creation of a new conversation via interface 22, the texting application may provide interface 22 with data referring to interactions being made via the texting channel, or may have preconfigured its instance of the conversation engine 20 accordingly to be specific to texting. On the other hand, an email hierarchical taxonomy 30 with a different structure of hierarchy than a texting hierarchical taxonomy (say, with longer explanations, or including web links or even images that might not be desirable in a texting hierarchical taxonomy) may automatically be selected by an email application that integrates the conversation engine 20, so that query data provided via interface 22 to conversation engine 20 are used by first retrieval process 24 to access the email hierarchical taxonomy 30 rather than the texting hierarchical taxonomy 30 thereby to "tune" the navigation process to the channel by which the underlying content is to be accessed. As a result, various channels can be accommodated without requiring fundamental changes to the content or to the development of the conversation engine 20 itself.

Furthermore, with the disclosed architecture a hierarchical taxonomy 30 can be disaggregated from a tagged-content source 40, and yet be both available to a user for accessing the content. This disaggregation is useful for a number of reasons. For example, an author of the original content, perhaps not having initially tagged the authored content with a view to making it accessible using a system such as system 10, may produce a hierarchical taxonomy 30 for the content that would provide nodes and sub nodes through which a user could navigate in order to locate content of interest. This may be done with a particular end user in mind, such as a beginner of the subject matter. Another taxonomy might perhaps be produced by the author for a professional but in connection with the same underlying tagged-content source 40. Different hierarchical taxonomies 30 may be created with different end devices in mind also, such as longer-form taxonomy descriptions for larger display screens, shorter-form taxonomy descriptions for smaller display screens, audio taxonomy recordings for interactive voice response user interfaces, and the like.

The author then, having produced the (or each) taxonomy, could hand-off the effort of tagging the underlying content that was authored, to a researcher to tag according to the taxonomy.

In an embodiment, interface 22 is an application programming interface (API) that provides a number of software functions accessible to an application that is incorporating, or at least accessing, system 10. Certain of these software functions are set out in Table 2, below:

TABLE 2

| Function | Description | Query Data | Response |
| --- | --- | --- | --- |
| createConversation | Causes the conversation engine to instantiate a new conversation instance for the user. | | New conversation ID for subsequent interaction with conversation; Initial response from conversation engine including initial options for valid responses. |
| conversationsidAddResponsePatch | Causes the conversation engine to add a response to the end of the conversation log. | Conversation ID; Query Data. | Full conversation to date, valid options for response or content from tagged document. |
| conversationsIdTagResponsesPatch | Adds metadata from the application (such as an email messageID generated by an email application when sending emails) | Metadata | Full conversation to date, valid options for response or content from tagged document. |
| ConversationsIdGet | Request a full conversation record by conversation ID | Conversation ID | Full conversation to date, valid options for response or document. |
| defaultTaggedDocument | Requests name of tagged document that is the default tagged document to which the conversation engine is configured to refer. | Conversation ID | Name of tagged document. |

TABLE 2-continued

| Function | Description | Query Data | Response |
|---|---|---|---|
| defaultTaxonomy | Requests name of taxonomy that is the default taxonomy to which the conversation engine is configured to refer. | | |
| searchTaggedDocuments | Request a list of the tagged documents available to the conversation engine | | List of tagged documents available to the conversation engine. |
| searchTaxonomies | Request a list of the taxonomies available to the conversation engine. | | List of taxonomies available to the conversation engine. |
| searchConversations | Request a list of the conversations maintained in the conversation engine. | | List of ConversationIDs corresponding to conversations maintained in the conversation engine. |

Figure 4A:
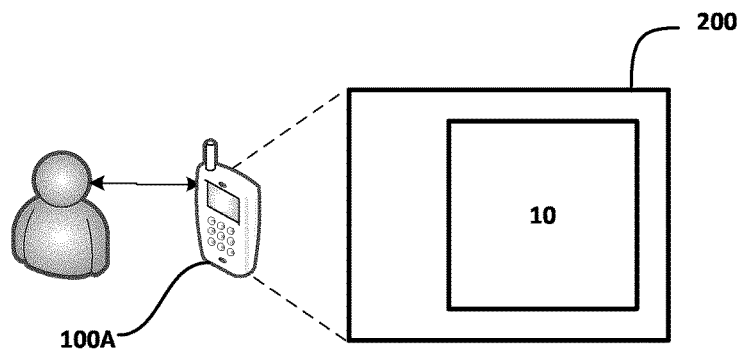
FIG. 4A is a schematic diagram showing an arrangement in which a user device has a locally-running application that integrates the system of FIG. 1.

FIG. 4A is a schematic diagram showing an arrangement in which a user device 100A, in this embodiment a smartphone, is usable by a person and has an application 200 running locally on the smartphone, with the application integrating a system 10 for carrying on a computer-based conversation. In such an embodiment, application 200 may locally integrate the entirety of a system such as system 10, or only apart of the system, such as for example only the conversation engine which, in turn, may refer to another device or devices through a network on which a hierarchical taxonomy 30 and a tagged-content source 40 may be sourced.

Figure 4B:
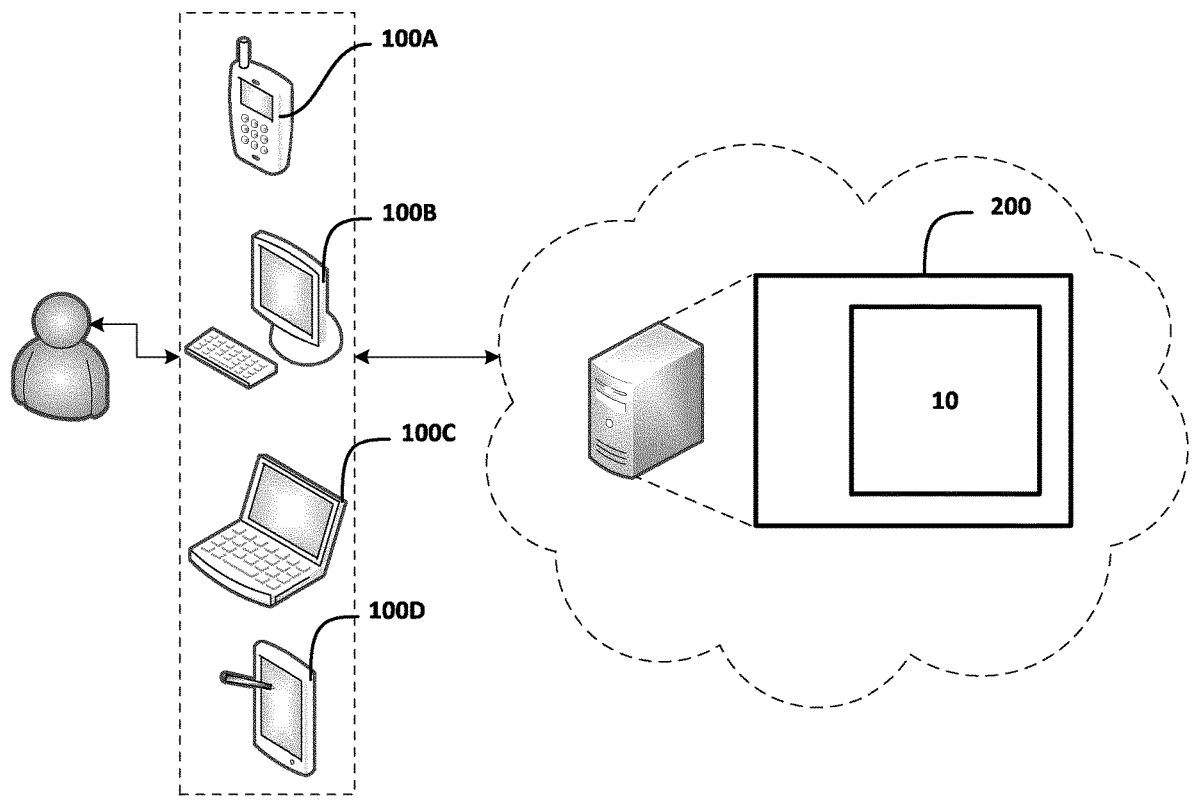
FIG. 4B is a schematic diagram showing an arrangement in which a user device interacts through a network with a server system that itself integrates the system of FIG. 1, thereby to provide a conversational user interface to the user device.

FIG. 4B is a schematic diagram showing an arrangement in which a user device 100A and other user devices 100B, 100C, 100D are each usable by a person or various people, but do not have an application that locally integrates a system such as system 10 for carrying on a computer-based conversation. Rather, each of devices 100A through 100D have respective applications with respective user interfaces for engaging in texting, web browsing, and the like. However, using the applications, messages such as emails, text messages or other kinds of messages may be sent through a network and be routed to a server that is configured with an application 200 that itself integrates system 10. For example, in an SMS implementation, a user may send an SMS message to a particular recipient that corresponds to an application running on a server or available on a set of servers. The application, in turn, operates in accordance with an application 200 which itself integrates a system such as system 10. As such, the application is able to query and receive responses via interface 22 of a conversation engine 20 of system 10 operating local to the application, thereby to access the corresponding hierarchical taxonomy 30 and tagged-content source 40 in order to provide the application with content to automatically send responding texts to the user in return.

Figure 5A:
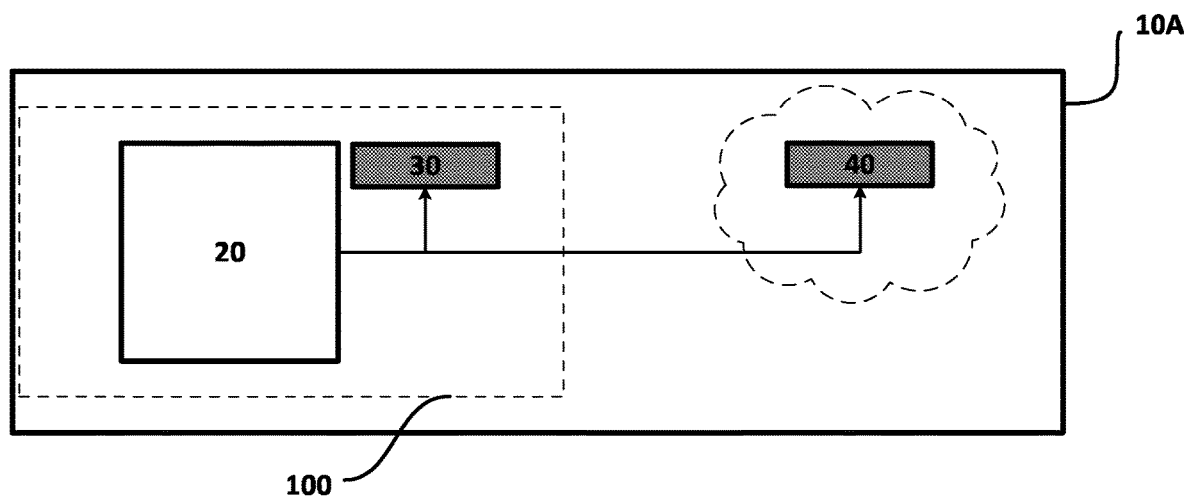
FIG. 5 is a schematic diagram of a system for carrying on a conversation, according to an alternative embodiment.

Various implementations of a system for carrying on a conversation that incorporate the aspects of the present invention are possible. For example, FIG. 5A is a schematic diagram of an alternative system 10A for carrying on a conversation, according to an embodiment. In this embodiment, conversation engine 20 and hierarchical taxonomy 30 are electronically stored locally on a user device 10 in conjunction with an application on user device 100, with the corresponding tagged-content source 40 being stored remotely and accessible via a network. This embodiment is useful from a computing architecture standpoint because a user of user device 100 can, using the application configured to interact with system 10A, navigate through hierarchical taxonomy 30 without making network requests and thus without taking up bandwidth on the network and incurring delays in receiving responses. Only once the user has navigate to an end of a branch of hierarchical taxonomy 30 would conversation engine 20 make a call through the network to tagged-content source 40 in order to retrieve second result data for use by the conversation engine 20 in generating a response. Furthermore, the actual tagged-content source 40, which may be a large set of information, would not have to be stored locally on the user device 100, thus relieving user device 100 storage requirements. This architecture also facilitates changes/updates to tagged-content source 40 being done without requiring each user device 100 to upload the changes/updates to local storage. On the other hand, if a change in the hierarchical taxonomy 30 is to be done, it may be done relatively straightforwardly by way of an application update including a relatively small file for hierarchical taxonomy 30. Such straightforward updates are common and acceptable to users particularly of mobile devices such as smartphones. This architecture also facilitates different users and/or different user devices being provided with different taxonomies 30 that all refer to a single format of tagged-content source 40.

Figure 5B:
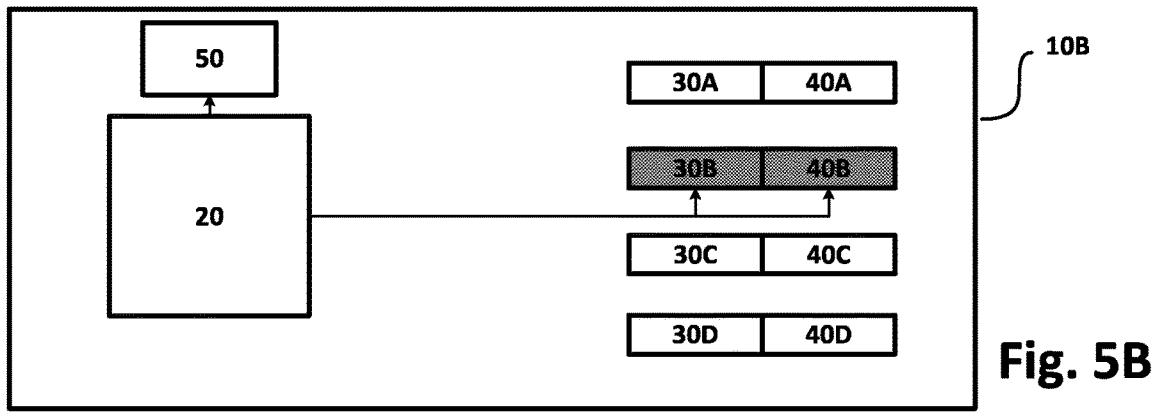

FIG. 5B is a schematic diagram of another alternative system 10B for carrying on a conversation, according to an embodiment. In this embodiment, conversation engine 20 is in communication with a subject index 50. Subject index 50 is, in this embodiment, a locally-stored data structure carrying data about one or multiple subjects and associated hierarchical taxonomies (hierarchical taxonomies 30A, 30B, 30C and 30D) and tagged-content sources (tagged-content sources 40A, 40B, 40C, and 40D) for each. As such, a given conversation engine 20 would not have to be limited to providing an application (and thus its user) with access to only one kind of content. For example, subject index 50 may be structured similarly to Table 3, below:

TABLE 3

| Subject ID | Subject Name | Hierarchical Taxonomy | Tagged-Content Source |
|---|---|---|---|
| 1 | Criminal Law | CriminalLaw.xls | CriminalLawForPros.xml |
| 2 | Legal Ethics | LegalEthics.csv | JohnsGuideToLegalEthics.xml |
| 3 | Civil Law | CivilLaw.csv | CivilLawGuide.xml |
| 4 | Legal AI | LegalAI.xls | OleynikGuideToLegalAI.xml |

According to this embodiment, an application integrating system 10B or at least its conversation engine 20, upon requesting to create a new conversation, would be provided by conversation engine 20 at the outset with a list of options for the conversation from subject index 50. For example, the application may be provided with a response from conversation engine 20 of system 10B that both acknowledges a conversation has begun and asks the application which of the four (4) choices the user should pick. In turn, the application may present all of these four choices, a subset of these four choices, or more than four choices for the user to select from.

It will be noted that if the application were to provide more than four choices in this example, the application might handle the selection by a user of any of the additional choices without providing the conversation engine 20 with a corresponding query via interface 22 to do so, since such additional choices would not accord to any of the above-described retrieval processes. Alternatively, the additional choice may be used by the application to call a different function than the above-described query in system 10B.

Upon selection by the user of one of the four presented choices, the application integrating system 10B would provide a response to the conversation engine 20 that included query data including the Subject ID corresponding to the user's choice. In turn, the conversation engine would establish, for this new conversation, the hierarchical taxonomy and the tagged-content source accordingly. For example, if the conversation engine 20, at this early stage of the conversation, were provided with query data including "2", according to Table 3 above the user will have chosen to converse about Legal Ethics. The conversation engine, having instantiated a conversation instance, would associate the hierarchical taxonomy LegalEthics.xls and the tagged-content source JohnsGuideToLegalEthics.xml with the conversation instance. This association is represented visually in FIG. 5B by the shaded 30B and 40B boxes.

Thereafter, the conversation would refer to the selected and thus associated hierarchical taxonomy 30B and tagged-content source 40B. In order to provide a response to the user's choice of subject, the response-generating process 28 of conversation engine 20 would then cause first retrieval process 24 to search in the hierarchical taxonomy LegalEthics.xls (hierarchical taxonomy 30B) starting with the topmost level. Identification of the topmost level would be done according to the protocol by which hierarchical taxonomies were to be created to properly be interacted with. For example, the topmost level could be level 0. In such an example, first retrieval process 24 would search in the file LegalEthics.xls for all children nodes of level 0 (in other words, the appropriate level 1 children), and would return first result data corresponding to the node identifiers and title data for each of the children in LegalEthics.xls. This first result data would be returned and response-generating process 28 would generate a response based on the first result data for providing via interface 22 to the querying application. The querying application would, in turn, return a corresponding response to the user and a prompt to select further options. This back and forth would continue until such time as the end of a branch (a node having no children nodes) in LegalEthics.xls (hierarchical taxonomy 30B) was reached such that the first result data for that point in the conversation included no options for a user (or was null, depending on the implementation). Response-generating process 28 would then cause second retrieval process 26 to search in JohnsGuideToLegalEthics.xml (tagged-content source 40B) for content that is tagged according to the query data for that point in the conversation, and would return such second result data to response-generating process 28 for, in turn, providing a response via interface 22 to the querying application. The querying application would, in turn, return a corresponding response to the user and potentially a prompt, depending on the requirements of the querying application.

The structure of the disclosed system enables authored content to be presented as assertions in response to options or questions being posed by the system. That is, the hierarchical taxonomy can be structured by the author or editor of the underlying content to provide guidance through the content with a series of one or more questions (depending on how the user chooses). In this way, the content are presented to the user as though it represents informed assertions being made by a counterpart user at the other end of the conversation in response to questions. The end user will be aware that there is not a human user at the other end of the conversation, but will appreciate the utility of being provided with conversational user interface for navigating the underlying content.

As the above description makes clear, how the conversation goes is not dependent on any content integrated into conversation engine 20, but instead is based on the structure of the selected hierarchical taxonomy 30 and the underlying tagged-content source 40 with which it is associated. In order to change the various options and pathways for a user to converse with the systems described herein, no reprogramming is required. Rather, an author or other personnel need only modify the hierarchical taxonomy or provide a new hierarchical taxonomy for use by the conversation engine, and structure the logic of the modified or new hierarchical taxonomy to correspond with the retrieval processes described herein. That is, to have uniquely-identifiable nodes and to represent parent-children relationships in the convention to which conversation engine 20 is oriented. Conversation engine 20 will retrieve data and generate responses whose content and options for further conversation is dependent on hierarchical taxonomy 30 and tagged-content source 40, and not on user-facing information that might be encapsulated within conversation engine 20.

Figure 5C:
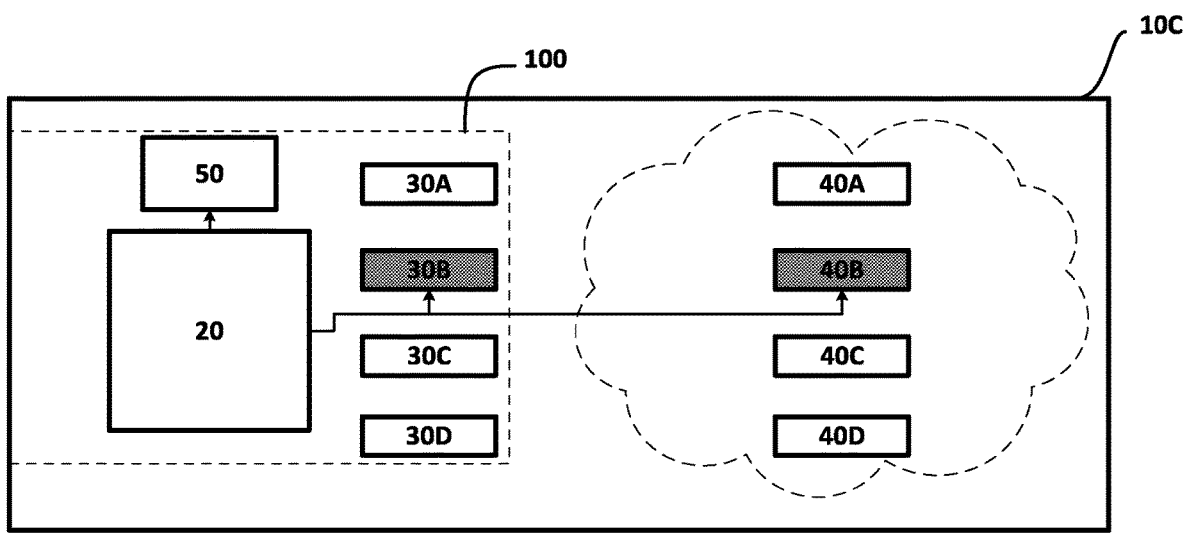

FIG. 5C is a schematic diagram of another alternative system 10C for carrying on a conversation, according to an embodiment. This embodiment is similar to the embodiment of FIG. 5B, except that the set of hierarchical taxonomies 30A through 30D are stored locally on a user device 100, whereas the corresponding tagged-content sources 40A through 40D are stored remotely and accessible via a network. As will be understood, as the number of subjects to which a user has access increases, the storage requirements for the corresponding content will rise. By logically and physically separating the hierarchical taxonomies 30A-30D, which will be comparatively much smaller in size than their tagged-content source counterparts, from the tagged-content sources 40A-40D, local storage on user device 100 does not have to be burdened with the underlying content itself but can still provide rapid access to the user by referring locally to one of the hierarchical taxonomies 30A-30D selected by reference to subject index 50.

Figure 5D:
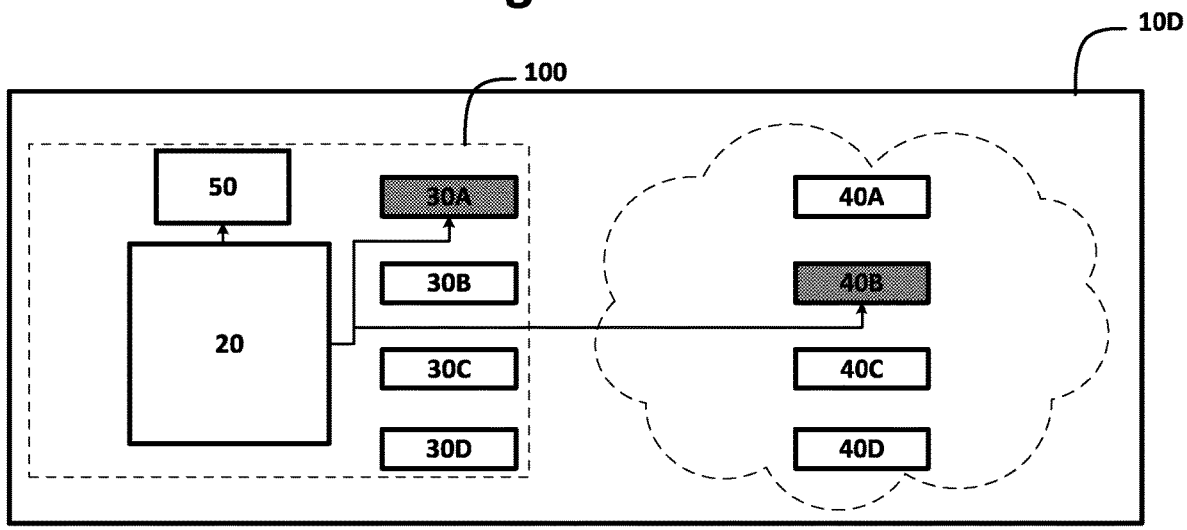

FIG. 5D is a schematic diagram of another alternative system 10D for carrying on a conversation. This embodiment is similar to the embodiment of FIG. 5C, except that a different hierarchical taxonomy (taxonomy 30A) is selected for the underlying content in tagged-content source 40B. While it will not be useful for a user to be provided with access to a hierarchical taxonomy 30 and a tagged-content source 40 that are not corresponding, this architecture may be provided where a tagged-content source 40 is tagged to serve two different hierarchical taxonomies 30. For example, one of the taxonomies—for example taxonomy 30A—may be suited for accessing a particular subset of content in tagged-content source 40B whereas another of the taxonomies—for example taxonomy 30B—may be suited for accessing a particular different subset of the same tagged-content source 40B. This architecture is useful where a user has access to one underlying textbook that itself covers a number of different-enough topics that can support different-enough conversations. For example, a single textbook may include content on Legal Ethics and on Civil Law. In such an instance, a user could select the subject from the subject index 50 to be guided to an appropriate hierarchical taxonomy 30 which would help the user navigate the same textbook (i.e., a tagged-content source 40), but in a different way. Also, in the event that a different textbook on the subject of Legal Ethics later becomes available for use with system 10D, it would a simple matter for the information in Table 3 to be changed accordingly to refer to the different textbook and a different hierarchical taxonomy 30 prepared for the different textbook, without affecting the user's ability to choose the subject itself. This architecture is also applicable to framing a single passage of text in a single textbook including interwoven subject-matter, differently using two (or more) different taxonomies. That is, a single sentence in the underlying content might be made accessible to a user or different users via multiple different taxonomies, since the sentence might be appropriate for framing in two or more taxonomy concepts. For example, in the civil law context, a single chunk of text in a civil law textbook might contain content about civil law in general interwoven with content about costs in civil law. Accordingly, because of the architecture described herein, a taxonomy specific to costs in civil law could be produced, presented and navigated so as to "draw" content from the same chunk of text—in some cases, perhaps, the same content—from which a different taxonomy for civil law could also draw. The flexibility in upgrading and data management available with this architecture can be very useful.

Figure 5E:
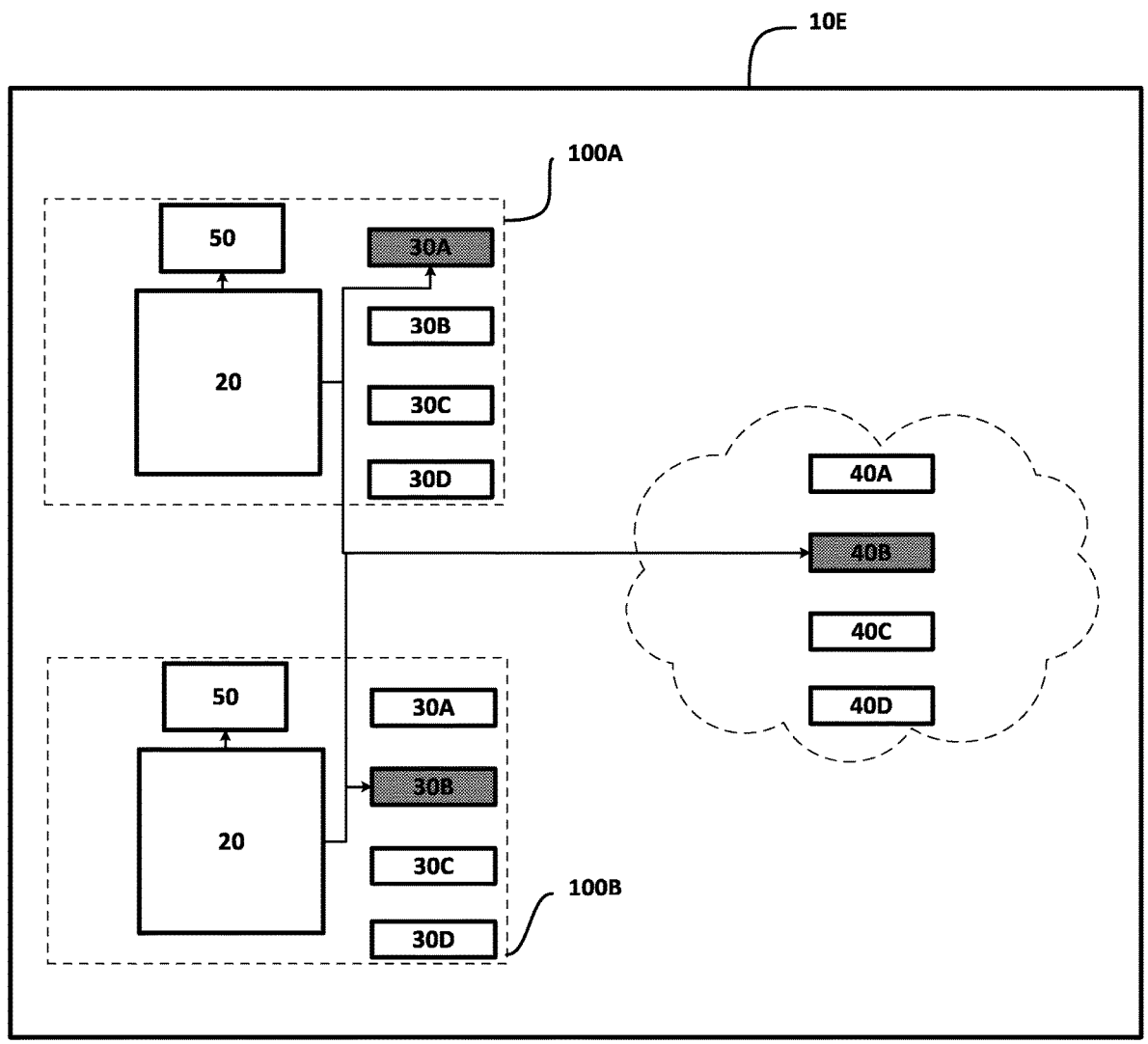

FIG. 5E is a schematic diagram of another alternative system 10E for carrying on a conversation. In this embodiment, two different user devices 100A and 100B are used differently, perhaps by different users, and their respective conversation engines 20 can cause their respective first retrieval processes 24 to retrieve respective first result data from respective different hierarchical taxonomies 30A, 30B. However, both of their respective second retrieval processes 26 are configured to access the same tagged-content source 40B remotely, or respective copies of the same tagged-content source 40B, as the computer implementation may require.

As will be understood, various alternative configuration based on the general principles described above and in the figures are possible.

Figure 6:
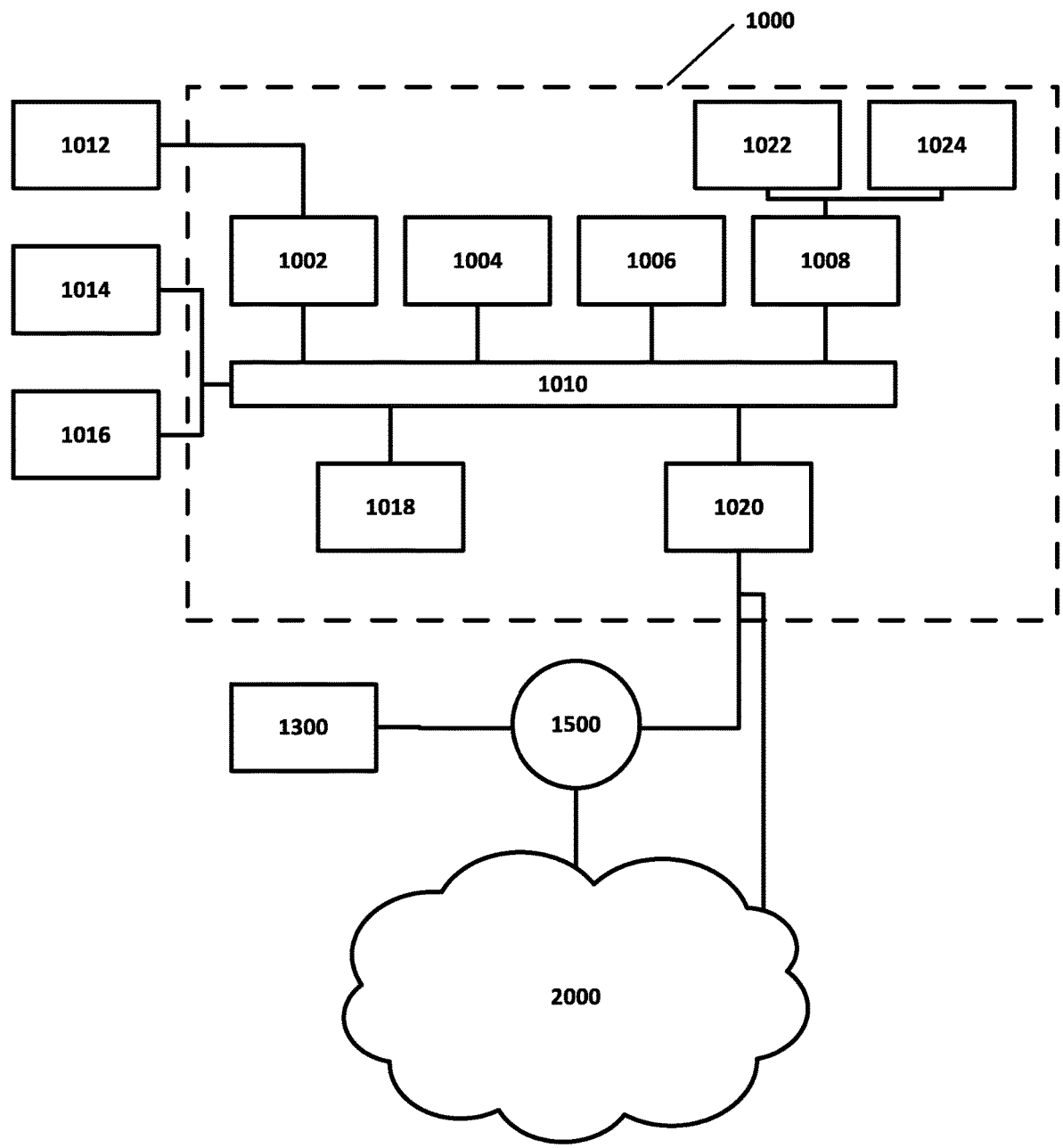
FIG. 6 is a schematic diagram of a system for carrying on a conversation, according to another alternative embodiment.

FIG. 6 is a schematic diagram showing a hardware architecture of a computing system 1000. Computing system 1000 is suitable as the hardware platform for any individual system 10, whether system 10 is to be implemented fully on user equipment such as a mobile device, whether system 10 is to be implemented as a distributed system using a number of computing systems such as computing system 1000 in order to provide a client-server implementation having one server or many servers such as in a cloud system or a proprietary server system implemented solely to provide a system for computer-based conversation.

Computing system 1000 includes a bus 1010 or other communication mechanism for communicating information, and a processor 1018 coupled with the bus 1010 for processing the information. The computing system 1000 also includes a main memory 1004, such as a random access memory (RAM) or other dynamic storage device (e.g., dynamic RAM (DRAM), static RAM (SRAM), and synchronous DRAM (SDRAM)), coupled to the bus 1010 for storing information and instructions to be executed by processor 1018. In addition, the main memory 1004 may be used for storing temporary variables or other intermediate information during the execution of instructions by the processor 1018. Processor 1018 may include memory structures such as registers for storing such temporary variables or other intermediate information during execution of instructions. The computing system 1000 further includes a read only memory (ROM) 1006 or other static storage device (e.g., programmable ROM (PROM), erasable PROM (EPROM), and electrically erasable PROM (EEPROM)) coupled to the bus 1010 for storing static information and instructions for the processor 1018.

Computing system 1000 also includes a disk controller 1008 coupled to the bus 1010 to control one or more storage devices for storing information and instructions, such as a magnetic hard disk 1022 and/or a solid state drive (SSD) and/or a flash drive, and a removable media drive 1024 (e.g., solid state drive such as USB key or external hard drive, floppy disk drive, read-only compact disc drive, read/write compact disc drive, compact disc jukebox, tape drive, and removable magneto-optical drive). The storage devices may be added to the computing system 1000 using an appropriate device interface (e.g., Serial ATA (SATA), peripheral component interconnect (PCI), small computing system interface (SCSI), integrated device electronics (IDE), enhanced-IDE (E-IDE), direct memory access (DMA), ultra-DMA, as well as cloud-based device interfaces).

Computing system 1000 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

Computing system 1000 also includes a display controller 1002 coupled to the bus 1010 to control a display 1012, such as an LED (light emitting diode) screen, organic LED (OLED) screen, liquid crystal display (LCD) screen or some other device suitable for displaying information to a computer user. In embodiments, display controller 1002 incorporates a dedicated graphics processing unit (GPU) for processing mainly graphics-intensive or other highly-parallel operations. Such operations may include rendering by applying texturing, shading and the like to wireframe objects including polygons such as spheres and cubes thereby to relieve processor 1018 of having to undertake such intensive operations at the expense of overall performance of computing system 1000. The GPU may incorporate dedicated graphics memory for storing data generated during its operations, and includes a frame buffer RAM memory for storing processing results as bitmaps to be used to activate pixels of display 1012. The GPU may be instructed to undertake various operations by applications running on computing system 1000 using a graphics-directed application programming interface (API) such as OpenGL, Direct3D and the like.

Computing system 1000 includes input devices, such as a keyboard 1014 and a pointing device 1016, for interacting with a computer user and providing information to the processor 1018. The pointing device 1016, for example, may be a mouse, a trackball, or a pointing stick for communicating direction information and command selections to the processor 1018 and for controlling cursor movement on the display 1012. The computing system 1000 may employ a display device that is coupled with an input device, such as a touch screen. Other input devices may be employed, such as those that provide data to the computing system via wires or wirelessly, such as gesture detectors including infrared detectors, gyroscopes, accelerometers, radar/sonar and the like. A printer may provide printed listings of data stored and/or generated by the computing system 1000.

Computing system 1000 performs a portion or all of the processing steps discussed herein in response to the processor 1018 and/or GPU of display controller 1002 executing one or more sequences of one or more instructions contained in a memory, such as the main memory 1004. Such instructions may be read into the main memory 1004 from another processor readable medium, such as a hard disk 1022 or a removable media drive 1024. One or more processors in a multi-processing arrangement such as computing system 1000 having both a central processing unit and one or more graphics processing unit may also be employed to execute the sequences of instructions contained in main memory 1004 or in dedicated graphics memory of the GPU. In alternative embodiments, hard-wired circuitry may be used in place of or in combination with software instructions.

As stated above, computing system 1000 includes at least one processor readable medium or memory for holding instructions programmed according to the teachings of the invention and for containing data structures, tables, records, or other data described herein. Examples of processor readable media are solid state devices (SSD), flash-based drives, compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of processor readable media, is software for controlling the computing system 1000, for driving a device or devices to perform the functions discussed herein, and for enabling computing system 1000 to interact with a human user (e.g., for controlling mixing of live-streams of audio and video and other media). Such software may include, but is not limited to, device drivers, operating systems, development tools, and applications software. Such processor readable media further includes the computer program product for performing all or a portion (if processing is distributed) of the processing performed discussed herein.

The computer code devices discussed herein may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

A processor readable medium providing instructions to a processor 1018 may take many forms, including but not limited to, non-volatile media, volatile media, and transmission media. Non-volatile media includes, for example, optical, magnetic disks, and magneto-optical disks, such as the hard disk 1022 or the removable media drive 1024. Volatile media includes dynamic memory, such as the main memory 1004. Transmission media includes coaxial cables, copper wire and fiber optics, including the wires that make up the bus 1010. Transmission media also may also take the form of acoustic or light waves, such as those generated during radio wave and infrared data communications using various communications protocols.

Various forms of processor readable media may be involved in carrying out one or more sequences of one or more instructions to processor 1018 for execution. For example, the instructions may initially be carried on a magnetic disk of a remote computer. The remote computer can load the instructions for implementing all or a portion of the present invention remotely into a dynamic memory and send the instructions over a wired or wireless connection using a modem. A modem local to the computing system 1000 may receive the data via wired Ethernet or wirelessly via Wi-Fi and place the data on the bus 1010. The bus 1010 carries the data to the main memory 1004, from which the processor 1018 retrieves and executes the instructions. The instructions received by the main memory 1004 may optionally be stored on storage device 1022 or 1024 either before or after execution by processor 1018.

Computing system 1000 also includes a communication interface 1020 coupled to the bus 1010. The communication interface 1020 provides a two-way data communication coupling to a network link that is connected to, for example, a local area network (LAN) 1500, or to another communications network 2000 such as the Internet. For example, the communication interface 1020 may be a network interface card to attach to any packet switched LAN. As another example, the communication interface 1020 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1020 sends and receives electrical, electromagnetic or optical signals that carry digital data streams representing various types of information.

The network link typically provides data communication through one or more networks to other data devices, including without limitation to enable the flow of electronic information. For example, the network link may provide a connection to another computer through a local network 1500 (e.g., a LAN) or through equipment operated by a service provider, which provides communication services through a communications network 2000. The local network 1500 and the communications network 2000 use, for example, electrical, electromagnetic, or optical signals that carry digital data streams, and the associated physical layer (e.g., CAT 5 cable, coaxial cable, optical fiber, etc.). The signals through the various networks and the signals on the network link and through the communication interface 1020, which carry the digital data to and from the computing system 1000, may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computing system 1000 can transmit and receive data, including program code, through the network(s) 1500 and 2000, the network link and the communication interface 1020. Moreover, the network link may provide a connection through a LAN 1500 to a mobile device 1300 such as a personal digital assistant (PDA) laptop computer, or cellular telephone.

Alternative configurations of computing system may be used to implement the systems and processes described herein.

Electronic data stores implemented in the database described herein may be one or more of a table, an array, a database, a structured data file, an XML file, or some other functional data store, such as hard disk 1022 or removable media 1024.

Figure 7A:
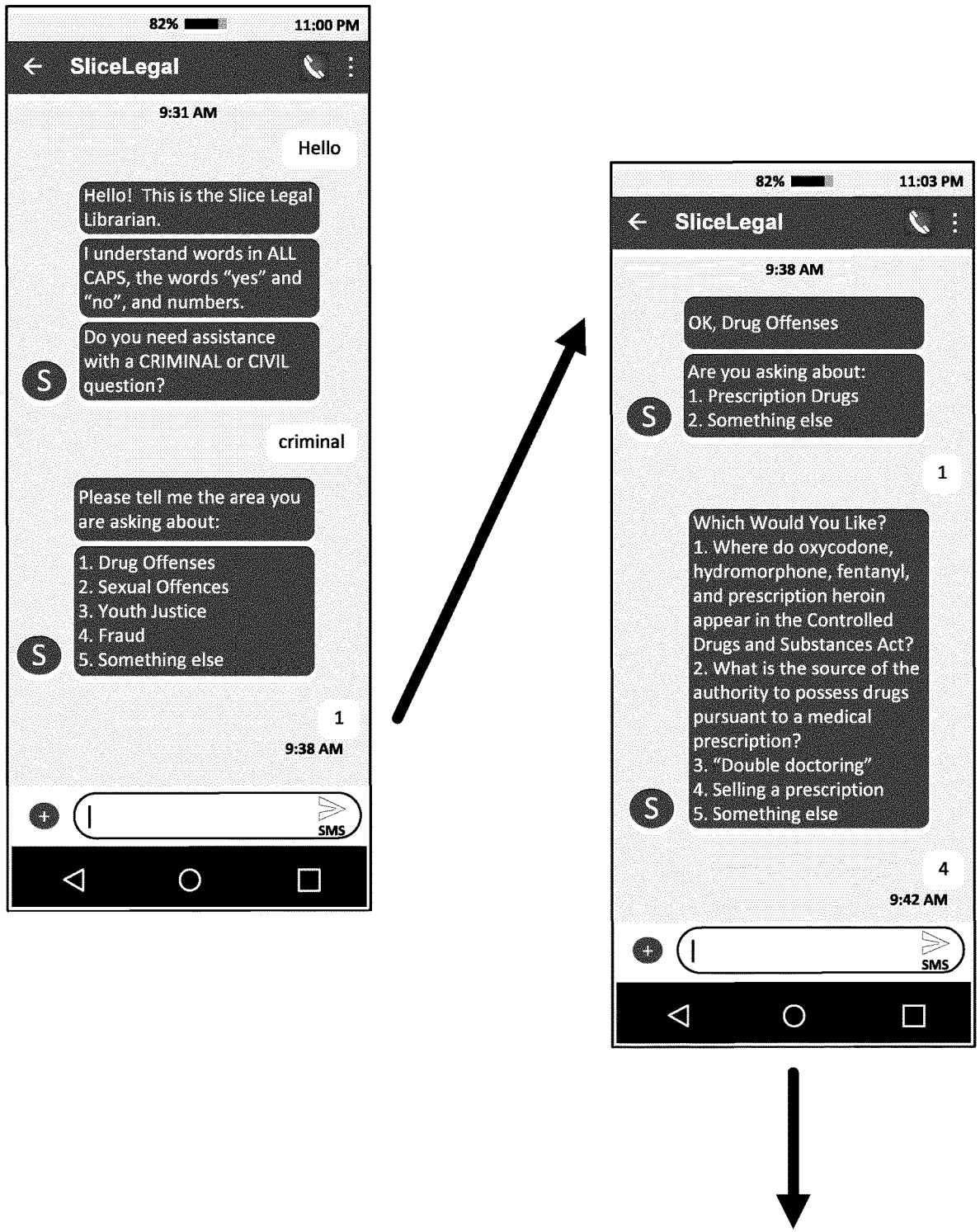
FIGS. 7A, 7B, and 7C, hereinafter referred to simply as FIG. 7, are screenshots of a user-facing text messaging application providing a conversation underpinned by the system of FIG. 1, according to an embodiment.
Figure 7B:
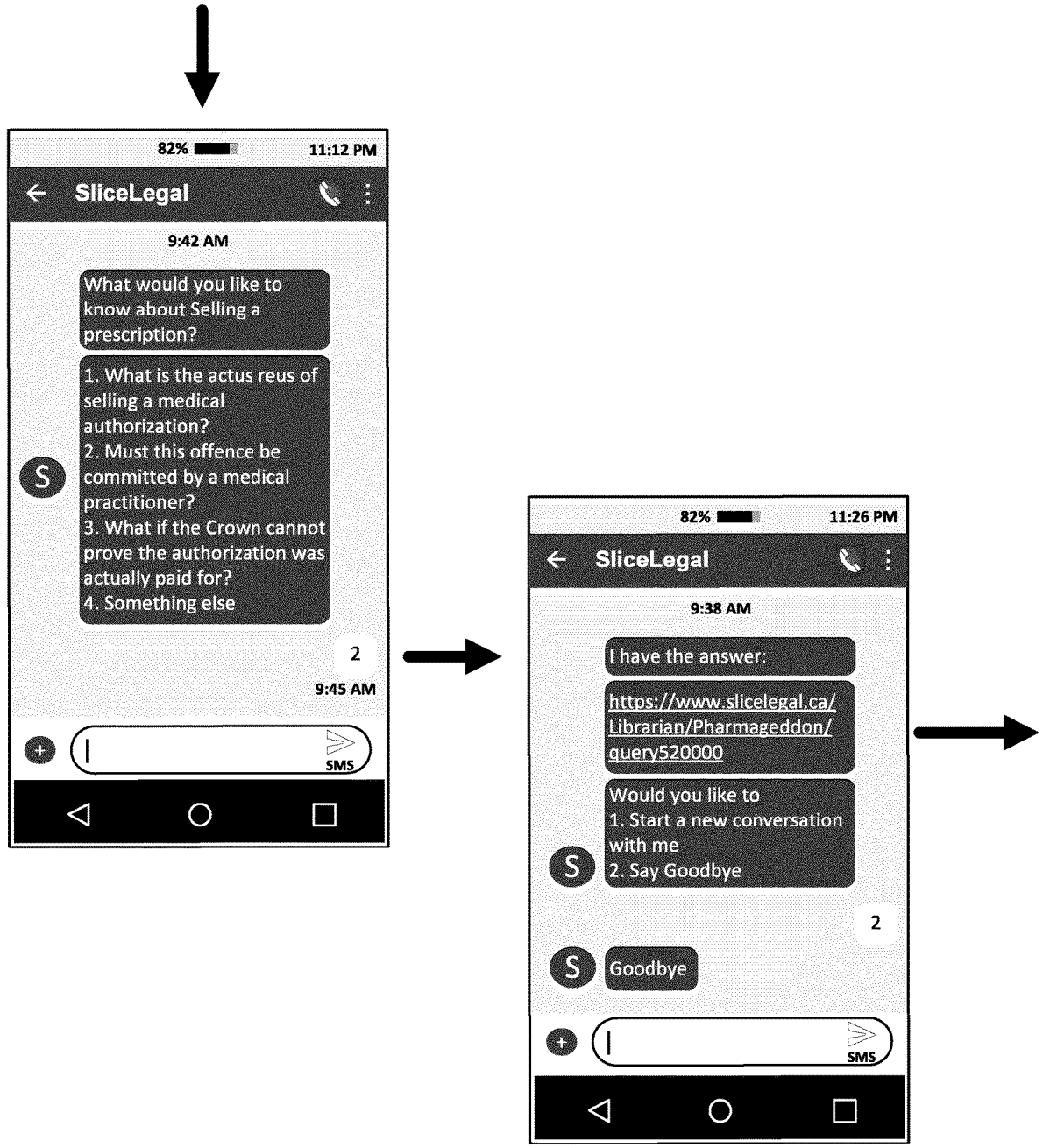
Figure 7C:
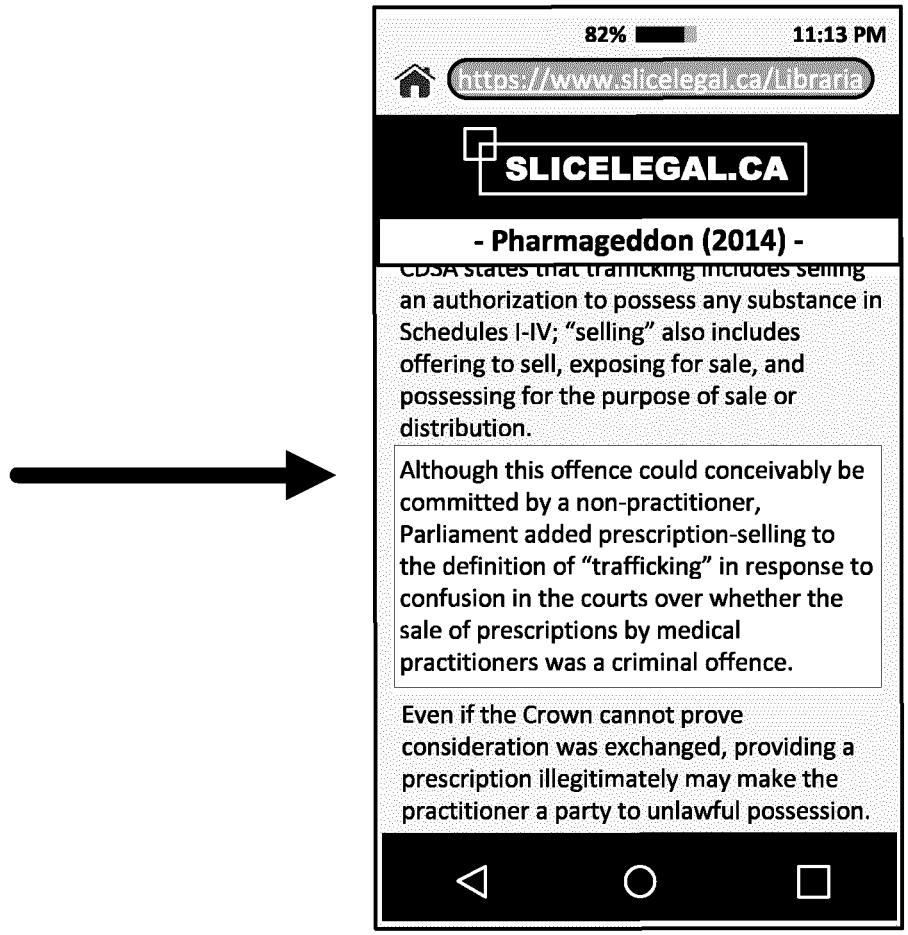

FIGS. 7A and 7B, hereinafter referred to as FIG. 7, are screenshots of a user-facing text messaging application providing a conversation underpinned by the system of FIG. 1, according to an embodiment.

As shown in FIG. 7, a user can begin a conversation by sending an SMS message to a particular telephone number or other unique destination endpoint suitable for telecommunications operations. In this embodiment, the unique destination endpoint is associated with an educational and professional publisher, in this example named Slice Legal. More particularly, the unique destination endpoint is associated with a Slice Legal application configured to carry on conversations with authorized users.

It will be understood that the unique system disclosed herein is capable of being used to provide new modes of access by users to the content that a textbook publisher provides. For example, a typical educational publication such as a textbook is not typically formatted for reading via a text messaging application, due to ergonomic factors such as the size of the screen, but also due to technical or financial factors such as the amount of networking bandwidth and/or text messaging costs that would be required to transport an entire textbook to a user device for display via the text messaging application. However, with the system of the present invention, an author/editor or other personnel could quite easily make portions or all of such a textbook available to a user. This would be done by the author carefully producing a hierarchical taxonomy 30 and causing the underlying content to be tagged to form a tagged-content source 40 corresponding to the hierarchical taxonomy 30. Using conversation engine 20 described herein, hierarchical taxonomy 30 is made available as the destination for the conversational back-and-forth with the user so that, once hierarchical taxonomy 30 has been successfully navigated, the particular associated subset of content (and not all of the content at once) in the tagged-content source 40 can then be transmitted to the user for reading using the text-messaging application.

Returning to FIG. 7, in this embodiment, the user has sent "Hello" to the SliceLegal application (designated "S"). S, in turn, using the principles described herein, produces a response to the user including a basic introductory response and also options for selection by the user for proceeding with the conversation as retrieved from the appropriate hierarchical taxonomy (or, as disclosed above, from a subject-index, depending on how the underlying content in the textbook or textbooks is available to one or more respective hierarchical taxonomies). In this example, the options are CRIMINAL and CIVIL.

The user types "criminal" and presses send. This selection, in turn, is used by S to provide corresponding query data to its conversation engine, which in turn provides top level selections from the hierarchical taxonomy document associated with a criminal textbook content available in a tagged-content source. The user types 1 and presses send, thereby to select the "Drug Offences" subtopic. This back and forth continues according to the conversation engine's retrieval of first result data from the hierarchical taxonomy document in accordance with successive selections by the user, until such time as the user makes a selection corresponding to a node in the hierarchical taxonomy that does not have any children for the first retrieval process of conversation engine to return. In turn, the response-generating process 28 executes the second retrieval process 26 to collect data corresponding to the query data from the underlying tagged-content source instead, and the application upon receiving the response from the response-generating process 28 is able to provide a response to the user. In this example, the response is in the form of a hyperlinked text that when clicked on from within the conversation opens a Web browser window and links to an external site (in this example, "slicelegal.ca"), and any follow-on responses. As discussed above, the tagged content itself could alternatively be presented in-line with the rest of the conversation.

Depending on how the underlying content is tagged/structured in the tagged-content source, and how this tagging/structuring is preserved by the conversation engine 20 when providing a response to a query from the application, the application can provide various kinds of responses and options and additional information to a user. How this information is structured and can be provided is almost entirely independent of conversation engine 20, as it depends on how the author or editor has developed the hierarchical taxonomy for a given type of user or device, which as described above is structurally disaggregated from the conversation engine.

Although embodiments have been described with reference to the drawings, those of skill in the art will appreciate that variations and modifications may be made without departing from the spirit, scope and purpose of the invention as defined by the appended claims.

For example, while embodiments described herein involve a user-facing application being a texting application such as an SMS (Short Messaging Service) application that is in communication with a server application that, in turn, provides queries of the described system for carrying on a conversation, alternatives are possible. For example, the user-facing application may be any application that provides a user with the ability to make successive requests and receive successive responses as though engaged in a conversation, such as a Web application, an e-mail application, Slack, Twitter and the like.

Furthermore, while embodiments disclosed herein provide valid next query options that are rigid in that a user must enter the exact text corresponding to a valid next query, alternatives are possible. For example, the valid next query option list may include alternative entries for a given option, thereby for example permitting provision of a query that is a number or is the text of a node, or is a disambiguable part of the text of the node.

Furthermore, user-facing applications such as SMS applications may be configured by their server-side counterparts to, at each point in a conversation, provide auto-complete based on the valid next query options (and not based more generally on the user's own dictionary), so as to ease the entry by a user and reduce the chance that an invalid response is provided.

Other forms of entry of information and easing entry of information for a user may be considered. For example, natural language processing (NLP) may be provided for easing the user's entry of a selection from the set of options, or for navigating from the outset of a conversation directly to a node or child node based on a closest-match with what the user has entered.

In embodiments, upon initiating a conversation, a user who has used the conversational user interface for the subject of interest before may wish to navigate through the hierarchical taxonomy to a particular child node thereby to "shortcut" through the hierarchical taxonomy. This may be implemented in, for example, the text messaging application by enabling text entered that does not match a valid option to be interpreted as a form of search request. The application may, in response, make an API call through the interface 22 of the conversation engine 20 providing the entered text and requesting that the hierarchical taxonomy 30 be "searched" for a node having a closest match to the text provided. In turn, the conversation engine 20 may execute a search process that identifies such a node and returns any children nodes appearing under the node, so that the response-generating process can construct a response including those children nodes as the next option. The user can then be provided by the application with such options from which to select for the next stage in the conversation. Alternatives are possible.

Various options for enabling a user to engage the system and for the service to be paid for are possible. For example, a logging and accounting process in or by a conversation engine may record when a user has engaged the system in order to charge a user or his/her organization per answer, or to decrease the number of answers available for a given time period under subscription terms.

While embodiments disclosed herein provide a first retrieval process 24 and a second retrieval process 26 that is only executed in the event that the first retrieval process 24 once executed receives first result data that does not have any options to present by the response-generating process 28, alternatives are possible. For example, in an alternative embodiment a first retrieval process 24 may, in additional to retrieving first result data as described above, also conduct more in-depth searching of the hierarchical taxonomy 30 to determine whether each of the children nodes that are to be returned do, or do not, have children. The conversation engine 20 could thereby be aware, after such a retrieval, of which children nodes would provide the current node with grandchildren nodes. This "grandchildren-provider" information could be maintained by the conversation engine 20 in association with each of the children nodes such that, in the event one of the options is selected corresponding to a child node that the conversation engine 20 would already be aware provides no grandchildren, the conversation engine 20 could proceed directly to executing the second retrieval process 26 without, at this stage in the conversation, having first executed the first retrieval process 24. That is, the conversation engine 20 would accordingly determine whether it should retrieve the result data for generating a response to a particular query solely from the tagged-content source 40 or solely from the hierarchical taxonomy 30. Technically, such an alternative implementation of the first retrieval process 24 would cause first retrieval process 24 to execute further processing steps each time it was to retrieve results data solely from the hierarchical taxonomy 30, thereby to obtain the "grandchildren-provider" information for conversation engine 20. Depending on the implementation, this alternative could use more processing cycles while retrieving from the hierarchical taxonomy 30. If the hierarchical taxonomy 30 were to be stored local to the user device, the extra processing cycles might not be noticeable to the user. However, were the tagged-content source 40 not local to the user device (for example being accessible only via a network call), it could be useful to provide as little latency as possible at this step of the conversation so the user, who might experience a slight delay due to retrieval latency, at least would not have to experience the additional slight delay beforehand of having the conversation engine 20 first execute the first retrieval process only to then "discover" that execution of the second retrieval process is required. Such delays might be imperceptible to a user, depending on how else the processing structure on the device is being simultaneously used and how rapidly network retrievals, if required, might be made.

FIG. 8 is a listing of functions available via an API for a software implementation of a conversation engine, for access via JavaScript scripting language.

What is claimed is:

1. A computer-implemented method of carrying on a conversation, the method comprising:

during a conversation session, receiving an electronic query initiated by a user;

based on query data associated with the electronic query, automatically retrieving result data from a hierarchical taxonomy, the query data comprising a node identifier associated with a respective node in the hierarchical taxonomy, the result data containing one or more user-selectable options;

generating an electronic response to the electronic query that contains at least the one or more user-selectable options each associated with a respective different node identifier identifying a respective different node in the hierarchical taxonomy;

during the conversation session, receiving sequent electronic query initiated by the user, the subsequent electronic query associated with subsequent query data, the subsequent query data at least containing one of the respective different node identifiers associated with a selected one of the one or more user-selectable options;

using the one of the respective different node identifiers associated with the selected one of the one or more user-selectable options as an assertion identifier, automatically retrieving subsequent result data containing an assertion uniquely tagged in a tagged-content source using the assertion identifier and generating a subsequent electronic response to the subsequent query to contain at least the subsequent result data, wherein the tagged-content source is not within the hierarchical taxonomy and contains a plurality of assertions each tagged using a respective assertion identifier, and further wherein node identifiers of nodes at the ends of branches in the hierarchical taxonomy are usable as the assertion identifiers.

2. The computer-implemented method of claim 1, wherein the electronic query and the subsequent electronic query are received from a user-facing application in response to user interactions with the user-facing application.

3. The computer-implemented method of claim 1, wherein the electronic query and the subsequent electronic query are received from a server application in response to user interactions with a user-facing application that is in communication with the server application.

4. The computer-implemented method of claim 1, further comprising, prior to receiving the electronic query:
   initiating the conversation session, comprising:
   receiving an electronic conversation request initiated by the user;
   creating a conversation session having an unique conversation identifier; and
   generating an electronic response to the conversation request, the electronic response to the conversation request including the unique conversation identifier,
   wherein the electronic query and the subsequent electronic query initiated by the user during the conversation session include the unique conversation identifier.

5. The computer-implemented method of claim 4, wherein initiating a conversation session comprises:
   automatically selecting the hierarchical taxonomy from a set of multiple electronically-stored hierarchical taxonomies; and
   automatically selecting the tagged-content source from a set of multiple electronically-stored tagged-content sources.

6. The computer-implemented method of claim 5, wherein the automatically selecting is based at least on a user's selection of a topic of the conversation.

7. The computer-implemented method of claim 6, further comprising generating a prompt in response to receiving the electronic conversation request for presentation to the user providing a plurality of user-selectable conversation topics.

8. The computer-implemented method of claim 4, wherein initiating a conversation session comprises:
   automatically selecting the hierarchical taxonomy from a set of multiple electronically-stored hierarchical taxonomies, wherein the tagged-content source in a set of multiple electronically-stored tagged-content sources is associated with the selected hierarchical taxonomy.

9. The computer-implemented method of claim 1, wherein respective contents of each of the hierarchical taxonomy and the tagged-content source are modifiable independently of one another.

10. The computer-implemented method of claim 1, wherein the one or more user selectable options in the result data correspond respectively to children nodes in the hierarchical taxonomy.

11. The computer-implemented method of claim 1, wherein:
   the electronic query and the subsequent electronic query are provided via an application programming interface (API) in response to user interactions with an application; and
   the electronic response and the subsequent electronic response to the electronic query and the subsequent electronic query, respectively, are provided to the application via the API.

12. A system for carrying on a computer-based conversation, the system comprising:
   a processor-implemented conversation engine comprising:
   an interface for receiving electronic queries and providing electronic responses to the electronic queries;
   a first retrieval process for retrieving first result data from a hierarchical taxonomy based on query data associated with a received electronic query, the query data comprising a node identifier associated with a respective node in the hierarchical taxonomy;
   a second retrieval process for retrieving second result data containing an assertion uniquely tagged in a tagged-content source using an assertion identifier, wherein the tagged-content source is not within the hierarchical taxonomy and contains a plurality of assertions each tagged using a respective assertion identifier; and
   a response-generating process responsive to the interface for:
   causing execution of the first retrieval process;
   in the event that the first result data contains one or more user-selectable options, generating the response containing at least the one or more user-selectable options each associated with a respective different node identifier identifying a respective different node in the hierarchical taxonomy; and otherwise:
   causing execution of the second retrieval process using the node identifier contained in the query data as an assertion identifier and generating the response containing at least the second result data,
   wherein node identifiers of nodes at the ends of branches in the hierarchical taxonomy are usable as the assertion identifiers.

13. The system of claim 12, further comprising:
   the hierarchical taxonomy; and
   the tagged-content source.

14. The system of claim 13, wherein the hierarchical taxonomy and the tagged-content source are electronically stored on respective different computers.

15. The system of claim 13, wherein respective contents of each of the hierarchical taxonomy and the tagged document are modifiable independently of one another.

16. The system of claim 12, wherein the interface is further for receiving an electronic conversation request initiated by a user and for providing a response to the electronic conversation request, the conversation engine further comprising:
   an initiation process for:
   automatically creating a conversation session in response to receiving the electronic conversation request, the conversation session having an unique conversation identifier;
   generating the response to the conversation request including the unique conversation identifier,
   wherein subsequent electronic queries initiated by the user during the conversation session include the unique conversation identifier.

17. The system of claim 12, wherein the one or more selectable user options in the first result data corresponding respectively to children nodes in the hierarchical taxonomy.

18. The system of claim 12, wherein:
   electronic queries are provided to the interface in response to user interactions with an application.

19. A non-transitory computer readable medium embodying a computer program executable on a server system for carrying on a conversation, the computer program comprising:

computer program code for, during a conversation session, receiving an electronic query initiated by a user;

computer program code for, based on query data associated with the query, automatically retrieving first result data from a hierarchical taxonomy, the query data comprising a node identifier associated with a respective node in the hierarchical taxonomy; and computer program code for:

in the event that the first result data contains one or more user-selectable options, generating an electronic response to the query that contains at least the one or more user-selectable options each associated with a respective different node identifier identifying a respective different node in the hierarchical taxonomy; and otherwise:

using the node identifier contained in the query data as an assertion identifier, automatically retrieving second result data containing an assertion uniquely tagged in a tagged-content source using the assertion identifier and generating the electronic response to the query to contain at least the second result data, wherein the tagged-content source is not within the hierarchical taxonomy and contains a plurality of assertions each tagged using a respective assertion identifier, and further wherein node identifiers of nodes at the ends of branches in the hierarchical taxonomy are usable as the assertion identifiers.

* * * * *

UNITED STATES PATENT AND TRADEMARK OFFICE
CERTIFICATE OF CORRECTION

PATENT NO. : 12,093,638 B2  
APPLICATION NO. : 17/612022  
DATED : September 17, 2024  
INVENTOR(S) : Matthew Oleynik and Chris Wise Page 1 of 1

It is certified that error appears in the above-identified patent and that said Letters Patent is hereby corrected as shown below:

In the Claims

Column 28, Line 59, "corresponding" should be changed to --correspond--.

Signed and Sealed this  
Fourth Day of March, 2025

Coke Morgan Stewart  
*Acting Director of the United States Patent and Trademark Office*